(12) United States Patent
Negri et al.

(10) Patent No.: US 9,169,426 B2
(45) Date of Patent: *Oct. 27, 2015

(54) JOINT COMPOUND, WALL ASSEMBLY, AND METHODS AND PRODUCTS RELATED THERETO

(71) Applicant: United States Gypsum Company, Chicago, IL (US)

(72) Inventors: Robert H. Negri, Lake Villa, IL (US); Mark Miklosz, Western Springs, IL (US); Pamela Hargrove, Cary, IL (US); Rafael Bury, Wheeling, IL (US)

(73) Assignee: United States Gypsum Company, Chicago, IL (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/034,290

(22) Filed: Sep. 23, 2013

(65) Prior Publication Data

US 2014/0083038 A1    Mar. 27, 2014

Related U.S. Application Data

(63) Continuation-in-part of application No. 13/842,342, filed on Mar. 15, 2013, now Pat. No. 8,931,230.

(60) Provisional application No. 61/705,551, filed on Sep. 25, 2012.

(51) Int. Cl.

| | |
|---|---|
| *C08J 9/32* | (2006.01) |
| *C09K 3/10* | (2006.01) |
| *E04F 13/02* | (2006.01) |
| *E04F 13/04* | (2006.01) |
| *C04B 26/00* | (2006.01) |
| *C08K 7/22* | (2006.01) |
| *C08K 7/28* | (2006.01) |
| *C08L 33/04* | (2006.01) |
| *C08L 63/00* | (2006.01) |
| *C08L 67/08* | (2006.01) |
| *C08L 75/04* | (2006.01) |
| *C04B 26/06* | (2006.01) |
| *C04B 26/14* | (2006.01) |
| *C04B 26/18* | (2006.01) |
| *C09J 133/02* | (2006.01) |
| *C04B 103/00* | (2006.01) |
| *C04B 111/00* | (2006.01) |
| *C04B 111/10* | (2006.01) |

(52) U.S. Cl.
CPC .............. *C09K 3/1006* (2013.01); *C04B 26/00* (2013.01); *C04B 26/06* (2013.01); *C04B 26/14* (2013.01); *C04B 26/18* (2013.01); *C08K 7/22* (2013.01); *C08K 7/28* (2013.01); *C08L 33/04* (2013.01); *C08L 63/00* (2013.01); *C08L 67/08* (2013.01); *C08L 75/04* (2013.01); *C09J 133/02* (2013.01); *E04F 13/02* (2013.01); *E04F 13/042* (2013.01); *C04B 2103/0065* (2013.01); *C04B 2111/00681* (2013.01); *C04B 2111/10* (2013.01); *C08L 2205/20* (2013.01)

(58) Field of Classification Search
CPC .......................................................... C08K 7/22
USPC .......................................................... 523/218
See application file for complete search history.

(56) References Cited

U.S. PATENT DOCUMENTS

| | | | |
|---|---|---|---|
| 5,277,712 A | 1/1994 | McInnis | |
| 5,746,822 A | 5/1998 | Espinoza et al. | |
| 6,295,776 B1 | 10/2001 | Kunz et al. | |
| 6,476,099 B1 | 11/2002 | Cimaglio et al. | |
| 6,722,092 B2 | 4/2004 | Kunz et al. | |
| 6,884,830 B1 | 4/2005 | Hornaman | |
| 8,931,230 B2 * | 1/2015 | Negri et al. ..................... | 52/417 |
| 2002/0073638 A1 | 6/2002 | Kunz et al. | |
| 2002/0129744 A1 | 9/2002 | Immordino, Jr. et al. | |
| 2003/0089058 A1 | 5/2003 | Kunz et al. | |
| 2004/0182287 A1 | 9/2004 | Ayambem | |
| 2005/0235878 A1 | 10/2005 | Podlas | |
| 2006/0159908 A1 | 7/2006 | Houck et al. | |

(Continued)

FOREIGN PATENT DOCUMENTS

| | | |
|---|---|---|
| JP | 60-223848 | 11/1985 |
| WO | WO 03/040243 | 5/2003 |

OTHER PUBLICATIONS

Petition for Retroactive Foreign Filing License (37 CFR 5.25) dated Jan. 8, 2014.
Renewed Petition for Retroactive Foreign Filing License (37 CFR 5.25) dated May 6, 2014.
Renewed Petition for Retroactive Foreign Filing License (37 CFR 5.25) dated Sep. 23, 2014.
Decision on Request Under 37 CFR 5.25 mailed Mar. 28, 2014.
Decision on Request Under 37 CFR 5.25 mailed Jul. 29, 2014.
Decision on Request Under 37 CFR 5.25 mailed Mar. 10, 2015.

*Primary Examiner* — Edward Cain
(74) *Attorney, Agent, or Firm* — Greer, Burns & Crain, Ltd.

(57) ABSTRACT

Disclosed are aspects of board finishing systems. For example, in various aspects, disclosed are joint compound compositions, wall assemblies, methods of treating walls, and products related to any of the foregoing, including reinforcement trim, e.g., for protecting corners where boards meet, fasteners, and tape. The joint compound preferably is a drying type composition with reduced shrinkage property, and includes binder and hollow spheres, resulting in an ultra lightweight formulation in some embodiments. The joint compound composition can be applied in a one-coat treatment in preferred embodiments. Other aspects of board finishing system accommodate such a one-coat treatment to thusly allow a user to manipulate the compound closer to the plane of board as compared with conventional formulations. Joint tape and reinforcement trim can include non-swelling synthetic paper facing material in some embodiments.

14 Claims, 28 Drawing Sheets

(56) References Cited

U.S. PATENT DOCUMENTS

| | | |
|---|---|---|
| 2010/0294430 A1 | 11/2010 | Hyman et al. |
| 2012/0031555 A1 | 2/2012 | Thompson et al. |
| 2014/0083035 A1 | 3/2014 | Negri et al. |
| 2014/0083038 A1 | 3/2014 | Negri et al. |
| 2015/0007519 A1 | 1/2015 | Negri et al. |
| 2015/0083303 A1 | 3/2015 | Negri et al. |

\* cited by examiner

JOINT COMPOUND, WALL ASSEMBLY, AND METHODS AND PRODUCTS RELATED THERETO

CROSS-REFERENCE TO RELATED APPLICATIONS

This patent application is a continuation-in-part patent application of copending U.S. patent application Ser. No. 13/842,342, filed Mar. 15, 2013, which claims the benefit of U.S. Provisional Patent Application No. 61/705,551, filed Sep. 25, 2012. All of the preceding patent applications are incorporated herein by reference in their entireties.

BACKGROUND OF THE INVENTION

In building construction, different types of claddings are used as panels for forming interior and exterior wall and ceiling surfaces. For simplicity, as used herein, it will be understood that the term "wall" also encompasses ceilings. Typically, the claddings are in the form of boards (also referred to as panels) affixed to framing members such as in balloon framing arrangements known in the art. Examples of claddings include gypsum board faced with paper, fibrous mats (e.g., fiberglass), and the like. These and other types of boards are typically cut to appropriate dimensions and then fastened to framing members, e.g., with screws, nails, or the like to form wall sections formed from multiple boards.

Such wall sections are normally finished to provide aesthetically pleasing, uniform, and protected surfaces. For example, two side-by-side boards disposed in the same plane will form a joint seam between them on vertical walls and horizontal ceilings. To finish the seam, joint reinforcement tape is embedded in the seam, along with a layer of joint compound under the tape, and multiple coats of joint compound applied over the tape. Some boards meet at an angle such as when forming a corner. Reinforcement bead can be utilized to hide the corner seam and to protect the corner. Reinforcement bead can be directly attached to the board using fasteners, or a layer of joint compound is applied under the trim to adhere the reinforcement bead to the board. The installed reinforcement is then concealed with multiple layers of joint compound applied over the trim. Fasteners used to affix the board to framing members must also be concealed with multiple layers of joint compound applied over them. After the various joint compound applications are dried, the resulting wall surfaces can be sanded and painted to form the desired uniform and aesthetically pleasing appearance.

The level of finishing as described above can vary. For example, with respect to gypsum wallboard, six (6) levels of gypsum board finish are understood in the art, ranging from zero (no treatment at all) to level five (the highest level of finish), as set forth in Gypsum Association document GA-214 and American Society for Testing and Materials ("ASTM") C840. The level of finish generally corresponds with the number of applications of joint compound to seams, trims, and fasteners. Levels three, four, and five are typically used for occupied spaces within buildings. For single family homes, level 4 is the most common level that is implemented. Level five is less frequently used and usually requires application of a skim coat of joint compound across the entire wall surface.

Conventional approaches for finishing wall assemblies as described above have not been fully satisfactory. The materials conventionally used to finish wall assemblies create significant inefficiencies in the process and also require an advanced level of skill to use effectively. For example, existing joint compounds require three separate coats to be applied to fasteners as well as multiple coats applied to flat seams between boards in the same plane and to corner seams. Each coat must separately dry which introduces significant downtime in the construction process, particularly since the other construction trades ordinarily cannot work inside the building while the wall finishing occurs. Each layer of joint compound can require about a day to dry, and it typically can take about a week to install the gypsum board and finish the flat joints, fasteners, and corner trims for a typical new construction of a home of 2,400 square feet of living space (corresponding to about 10,000 square feet of board).

In addition, the need for applying multiple coats of joint compound requires that the user manipulate the joint compound significantly above the plane of the board. To allow the board to appear flat to the naked eye (even though it is not), significant skill and workmanship is required to achieve the proper visual appearance when the user is functioning above the plane of the board. The additional layers of joint compound must be feathered out wider and wider from the seam in a graduated manner to make the seam appear aesthetically flat. If the user is not significantly skilled, the visual appearance will not be satisfactory.

It will be appreciated that this background description has been created by the inventors to aid the reader and is neither to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims and not by the ability of the claimed invention to solve any specific problem noted herein.

BRIEF SUMMARY OF THE INVENTION

In one aspect, the invention provides a drying-type joint compound composition. The joint composition comprises, consists, or consists essentially of binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi as measured according to ASTM D3102-78.

In another aspect, the invention provides a joint compound composition consisting essentially of (a) latex emulsion binder in an amount from about 3% to about 90% by weight of the wet composition; (b) a plurality of hollow spheres having an average isostatic crush strength of at least about 100 psi as measured according to ASTM D3102-78, wherein the spheres are present in an amount from about 5% to about 25% by weight of the wet composition; (c) nonionic surfactant in an amount from about 0.001% to about 5% by weight of the wet composition; and (d) humectant in an amount from about 0.001% to about 3% by weight of the wet composition; and, optionally, (e) defoamer in an amount from about 0.05% to about 5% by weight of the wet composition; (f) rheological modifier in an amount from about 0.1% to about 5% by weight of the wet composition; (g) biocide, in an amount from about 0.1% to about 1.5% by weight of the wet composition; (h) bulk filler, such as calcium carbonate or limestone in an amount from about 1% to about 40% by weight of the wet composition; and (i) delaminated clay, such as kaolin clay, in an amount from about 0.1% to about 5% by weight of the wet composition.

In another aspect, the invention provides a wall assembly comprising, consisting of, or consisting essentially of two adjacent boards, joined by a seam. Only one-coat of the joint compound is applied over the seam to provide a uniform aesthetic appearance. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi as measured according to ASTM D3102-78. The wall assembly further comprises dimensionally stable, non-swelling flat joint tape embedded in the seam.

In another aspect, the invention provides a method of treating a wallboard assembly of two adjacent boards joined by a seam. The method comprises, consists of, or consists essentially of applying joint tape and one coat of the joint compound composition to the seam. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi as measured according to ASTM D3102-78. The method further comprises drying the composition.

In another aspect, the invention provides a reinforcement trim for protecting a seam of two adjacent boards having opposing face and back surfaces, the faces being disposed with respect to each other at an angle between the board faces. The trim comprises, consists of, or consists essentially of paper face comprising non-swelling synthetic paper facing material and a backing. For example, the facing material can be laminated to a sturdy, rust-resistant material designed to impart superior long term corner angle joint reinforcement that exceeds the minimum performance requirements established in ASTM C1047-10a (Standard Specification for Accessories for Gypsum Wallboard and Gypsum Veneer Base) for crack resistance and chipping, resulting in corner vertex that remains straight during normal building movement and/or displacement and daily wear-and-tear. In some embodiments, the backing comprises metal such as galvanized steel and/or other backing material having the aforesaid desired properties, including, for example, composite laminate structure, layered paper, thermoplastic, thermoset, carbon fiber, polyester, polycarbonate, spun polyolefin, natural or synthetic fiber, woven material, and the like.

BRIEF DESCRIPTION OF THE SEVERAL VIEWS OF THE DRAWING(S)

FIGS. 2A-2B are alternative sectional views taken substantially from the line 2-2 of FIG. 1, wherein FIG. 2A illustrates a conventional taper for comparative purposes, while FIG. 2B illustrates a shallower taper in accordance with embodiments of the invention.

FIGS. 3A-3B are alternative sectional views of a finished joint of two wallboards with tapered edges abutting, wherein FIG. 3A illustrates a joint with conventional wide feathering of joint compound for comparative purposes, while FIG. 3B illustrates narrower feathering of joint compound, closer to the plane of the board, in accordance with embodiments of the invention.

FIGS. 3C-3D are alternative sectional views of a finished joint of two wallboards with square (i.e., non tapered) edges abutting, wherein FIG. 3C illustrates a conventional joint with wide feathering of joint compound for comparative purposes, while FIG. 3D illustrates narrower feathering of joint compound, closer to the plane of the board, in accordance with embodiments of the invention.

FIGS. 4A and 4B are exploded perspective views depicting reinforcement trim to be applied to a corner formed from two wallboards, wherein FIG. 4A shows an outside corner with angle (x), while FIG. 4B shows an inside corner with angle (y).

FIG. 7 illustrates a finished room installation after painting.

FIG. 8 depicts corner reinforcement trims in accordance with embodiments of the invention.

Figure 35A:
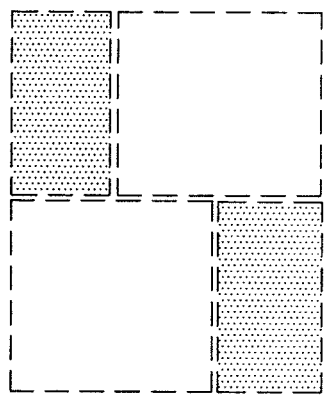

FIG. 35A illustrates a modified ASTM E72 racking assembly system with an 8'×8' (about 2.4 m×about 2.4 m) assembly prepared from 2"×4" wood studs (about 5 cm×about 10 cm). The wood studs are not shown.

Figure 35B:
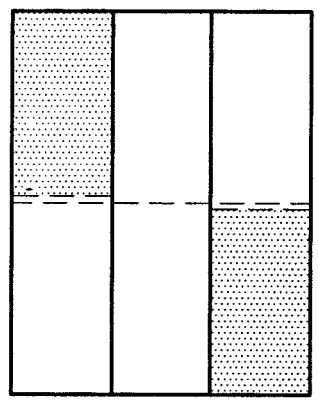

FIG. 35B illustrates the modified ASTM E72 racking assembly system of FIG. 35A configured with the 2"×4" wood studs placed 16 inches (about 0.4 m) apart.

Figure 35C:
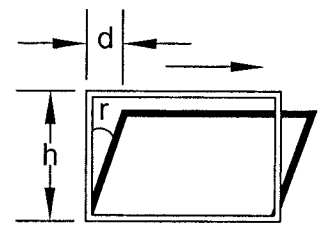

FIG. 35C illustrates the modified ASTM E72 racking assembly system of FIG. 35B, where the bottom was rigidly fixed to the structure, and a force was applied at the top left corner by a hydraulic ram programmed to run a sinusoidal waveform with varying amplitudes.

Figure 36A:
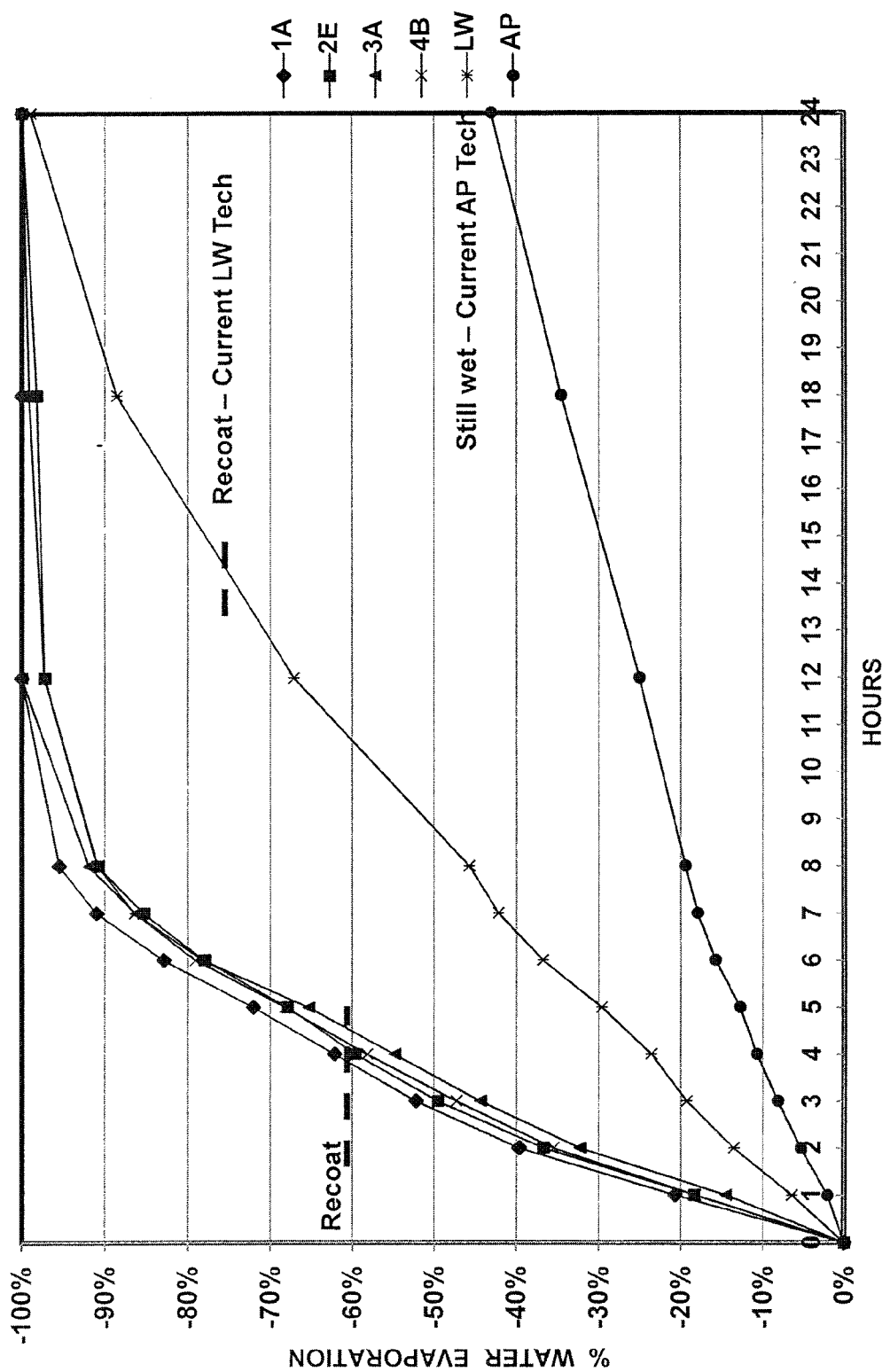
Figure 36B:
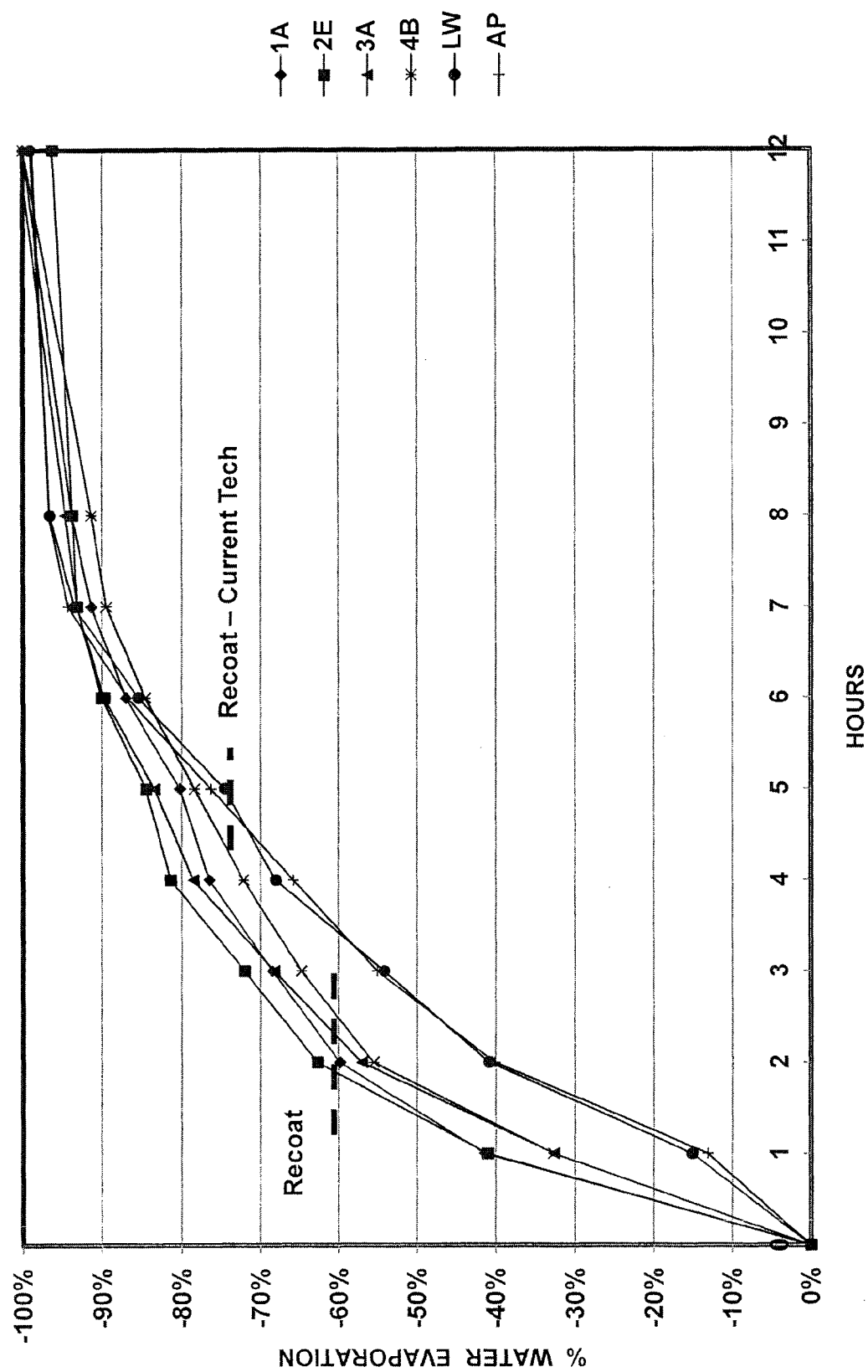
Figure 36C:
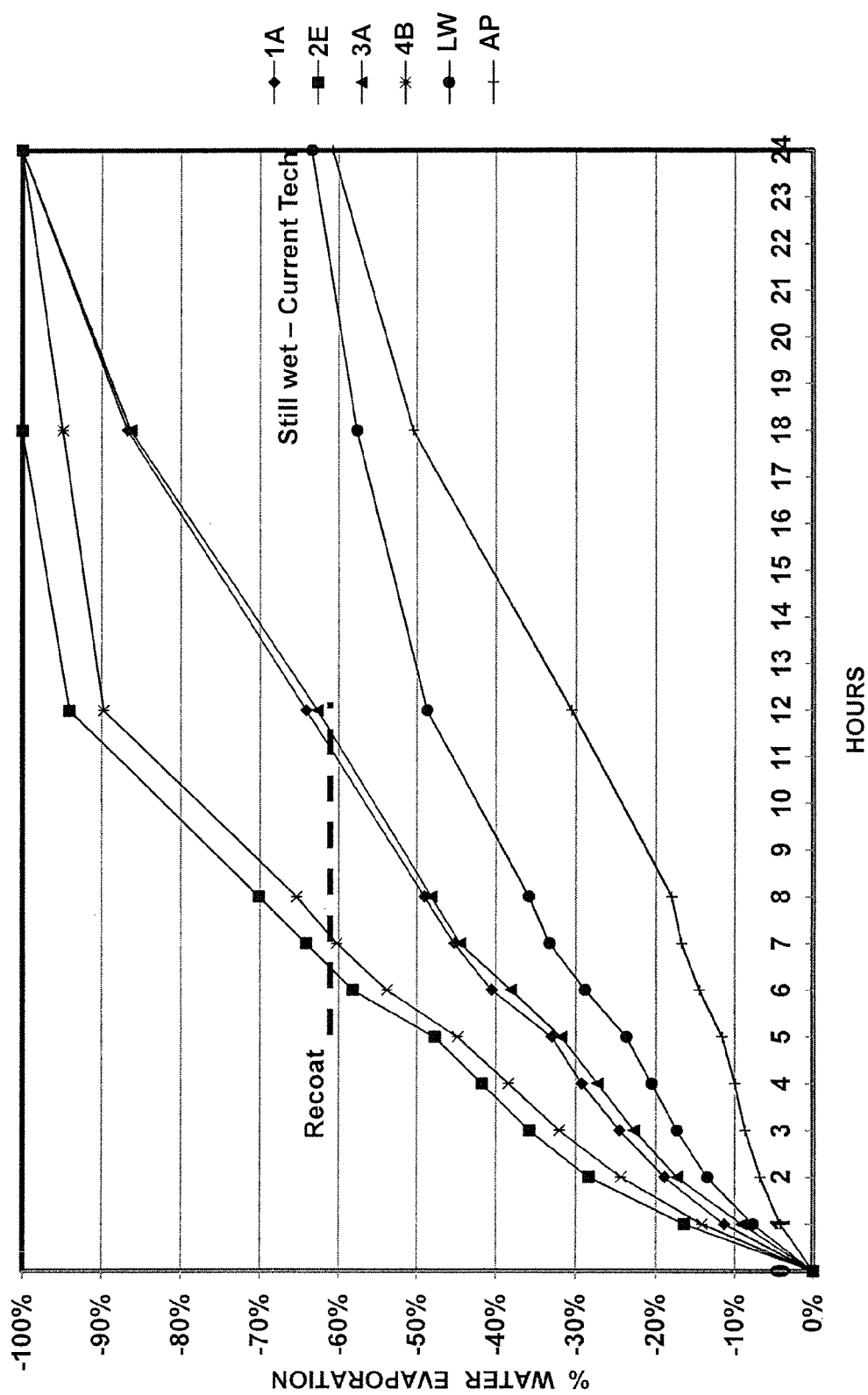

FIGS. 36A to 36C show the drying profile of the joint compounds of the present invention compared with the conventional joint compounds for a thick coat, i.e., about 3/16 inches (about 0.5 cm), in which the percent of water evaporated (Y-axis) was plotted against the incremental drying times represented along the X-axis). FIG. 36A shows the drying profiles in a moderate environment, e.g., 75° F. and 50% relative humidity. FIG. 36B shows the drying profiles in a hot and dry environment, e.g., 95° F. and 10% relative humidity. FIG. 36C shows the drying profiles in a cold and humid environment, e.g., 40° F. and 80% relative humidity.

Figure 37A:
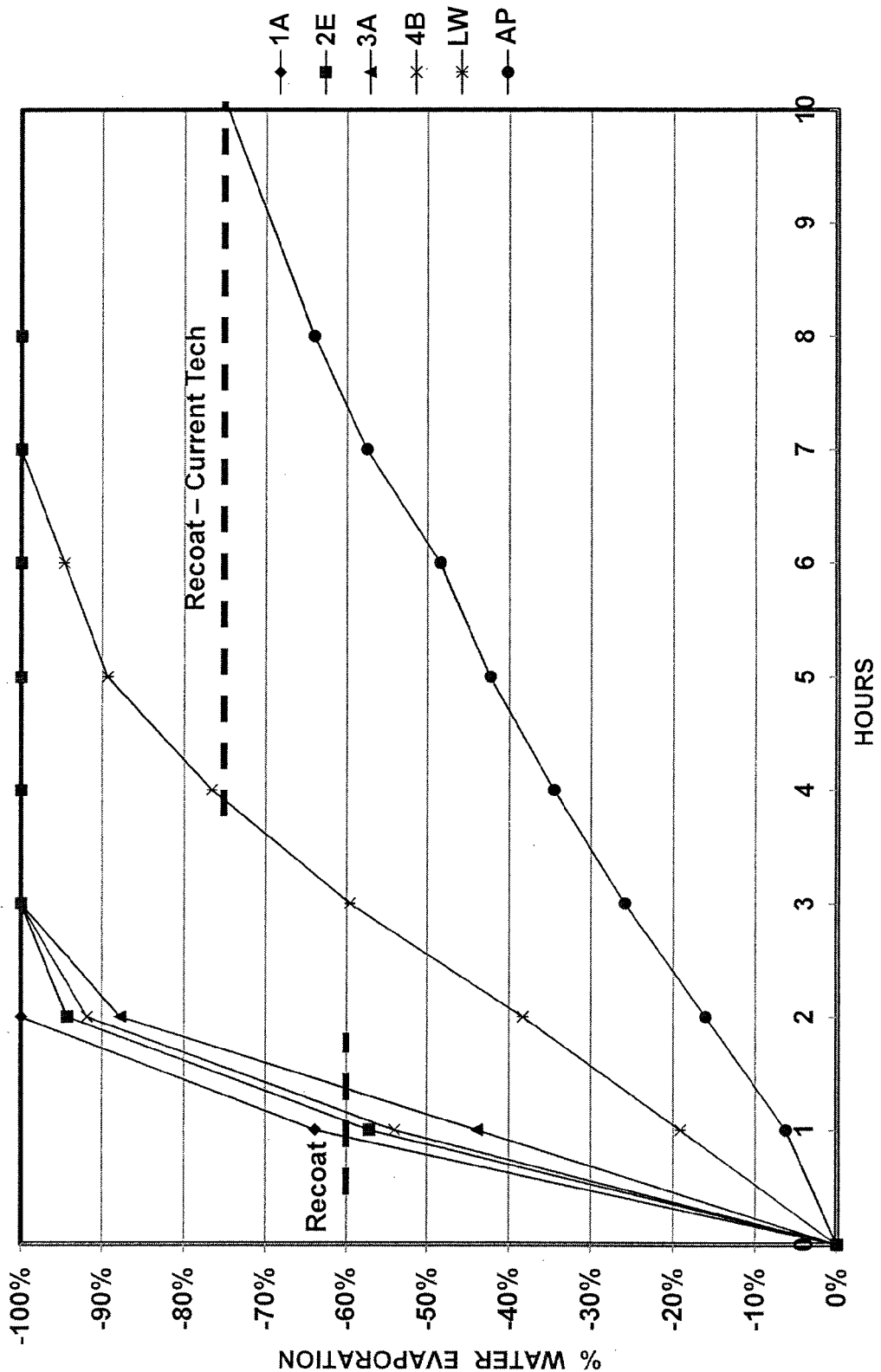
Figure 37B:
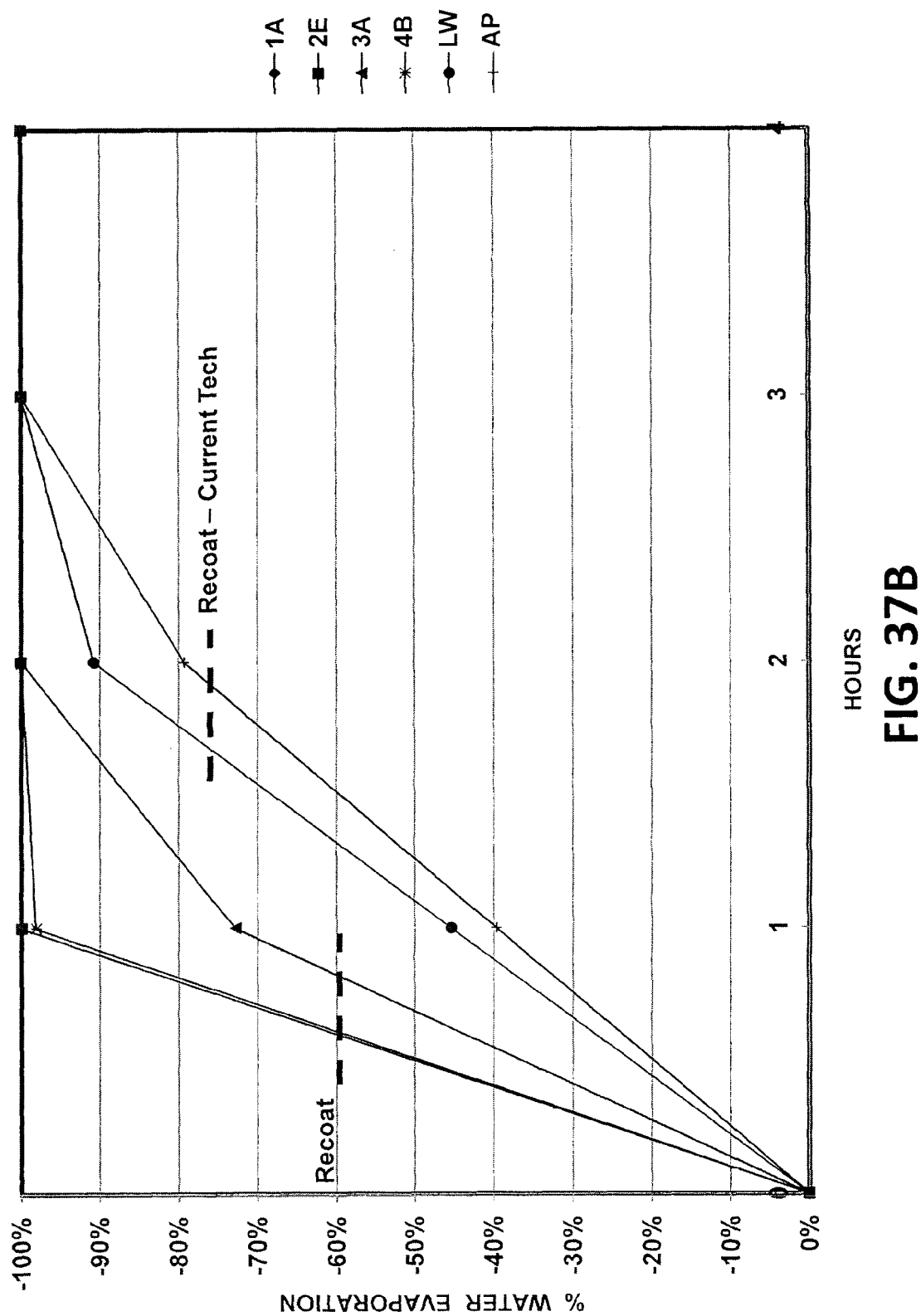
Figure 37C:
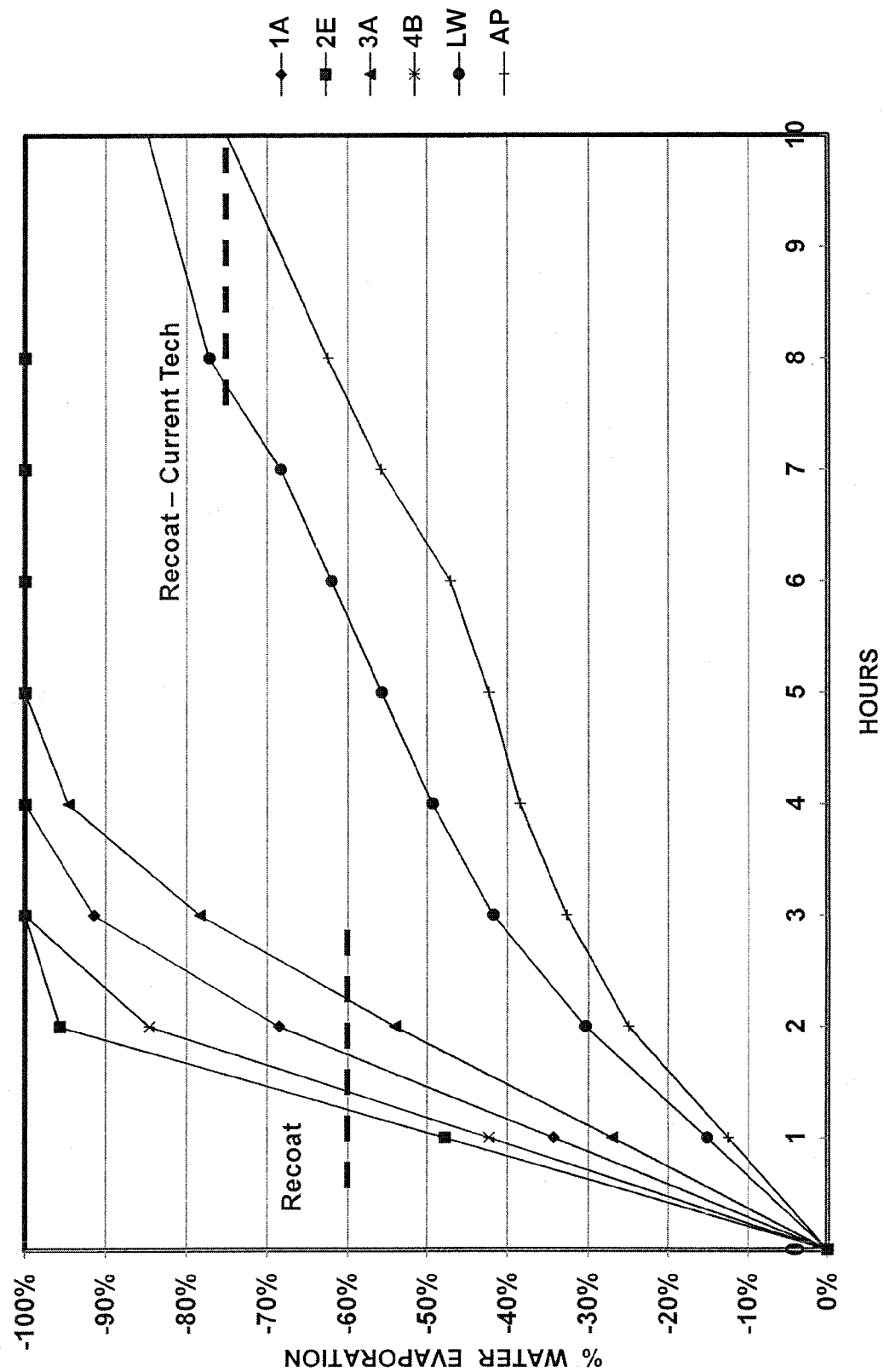

FIGS. 37A to 37C show the drying profile of the joint compounds of the present invention compared with the conventional joint compounds for a thin coat, i.e., about 1/16 inches (about 0.2 cm), in which the percent of water evaporated (Y-axis) was plotted against the incremental drying times represented along the X-axis). FIG. 37A shows the drying profiles in a moderate environment, e.g., 75° F. and 50% relative humidity. FIG. 37B shows the drying profiles in a hot and dry environment, e.g., 95° F. and 10% relative humidity. FIG. 37C shows the drying profiles in a cold and humid environment, e.g., 40° F. and 80% relative humidity.

DETAILED DESCRIPTION OF THE INVENTION

In various embodiments, the present invention relates to joint compound compositions, board finishing systems, wall assemblies, methods of treating walls, and products related to any of the foregoing, including reinforcement trim, e.g., for protecting corners where boards meet, fastener, and tape. Various aspects of the invention advantageously impart considerable efficiencies in the finishing of wall assemblies comprising cladding, such as gypsum drywall, mat-faced board (e.g., having fiberglass facing), and the like. For example, the present invention allows for wall finishing to take place with significantly fewer steps required for any given desired finish level, e.g., a level 4 finish in accordance with Gypsum Association document GA-214 and/or ASTM C840 ("level 4"). As a result, wall finishing can occur more rapidly with less downtime. In addition, wall finishing in accordance with aspects of the invention requires less skill by users during cladding installation.

One aspect of the invention is predicated, at least in part, on the surprising and unexpected discovery of joint compound composition that exhibits low shrinkage. As a result, the joint compound advantageously can be applied in fewer coats than conventional joint compounds. In some embodiments, only one coat of joint compound is used over fasteners, joint tape, or reinforcement trims. However, if desired, more than one coat (e.g., two or three coats) may be applied depending on the level of finish desired. For example, conventional systems suffer from significant shrinkage, such as, for example, exceeding 15%, e.g., about 18% or greater. Embodiments of the invention provide considerably less shrinkage. Embodiments of joint compound also exhibit desirable flexibility properties and can be sanded readily and, desirably, do not crack.

Because the joint compound composition can be applied in fewer coats, advantageously, a user can manipulate the joint compound closer to the plane of the board. Conventionally, in multi-coat (e.g., 3 coats or more) systems, the user must broadly feather the joint compound across a wide radius from the seam to provide a visual illusion of a flat surface. Significant skill is required for the user to achieve such appearance when the joint compound thickness elevates significantly above the plane of board and board seams. By using a one-coat joint compound in accordance with embodiments of the invention, a user will not need to feather the joint compound as widely, and less skill is necessary to achieve a flat visual appearance. In some embodiments, board is specially designed to have a smaller taper than conventional board or no taper at all (i.e., squared edge) in the machine direction edges as described herein.

In other aspects, the invention provides for a special non-swellable material that can be used in joint tape as well as for a face layer in reinforcement trim composite used to conceal and protect wall corners where two boards meet at an angle (e.g., an "inside" corner or "outside" corner as understood in the art). The trim can also include a backing (e.g., comprising metal or other material) to provide rigidity and support.

Adhesive can be used in various aspects of the invention. In some embodiments, the adhesive is an aqueous quick-drying adhesive such as an aqueous wall covering adhesive (e.g., such as those marketed by Roman Adhesives), an aqueous bonding agent (e.g., such as those marketed by United States Gypsum Company), or an aqueous latex emulsion glue (e.g., such as those marketing by OSI). For example, such adhesive can be applied to framing members to minimize the number of fasteners used to hang board. Adhesive can also be used to facilitate application of joint tape and reinforcement trim in accordance with embodiments of the invention.

A fastener, in accordance with embodiments of the invention, can be used to accommodate a single coat of joint compound. For example, the fastener can include a concave head design to create a dimpled effect although other fasteners are possible, including staples or other drywall screws. One or more of these various aspects can be combined in a board finishing system in accordance with embodiments of the invention.

Figure 1:
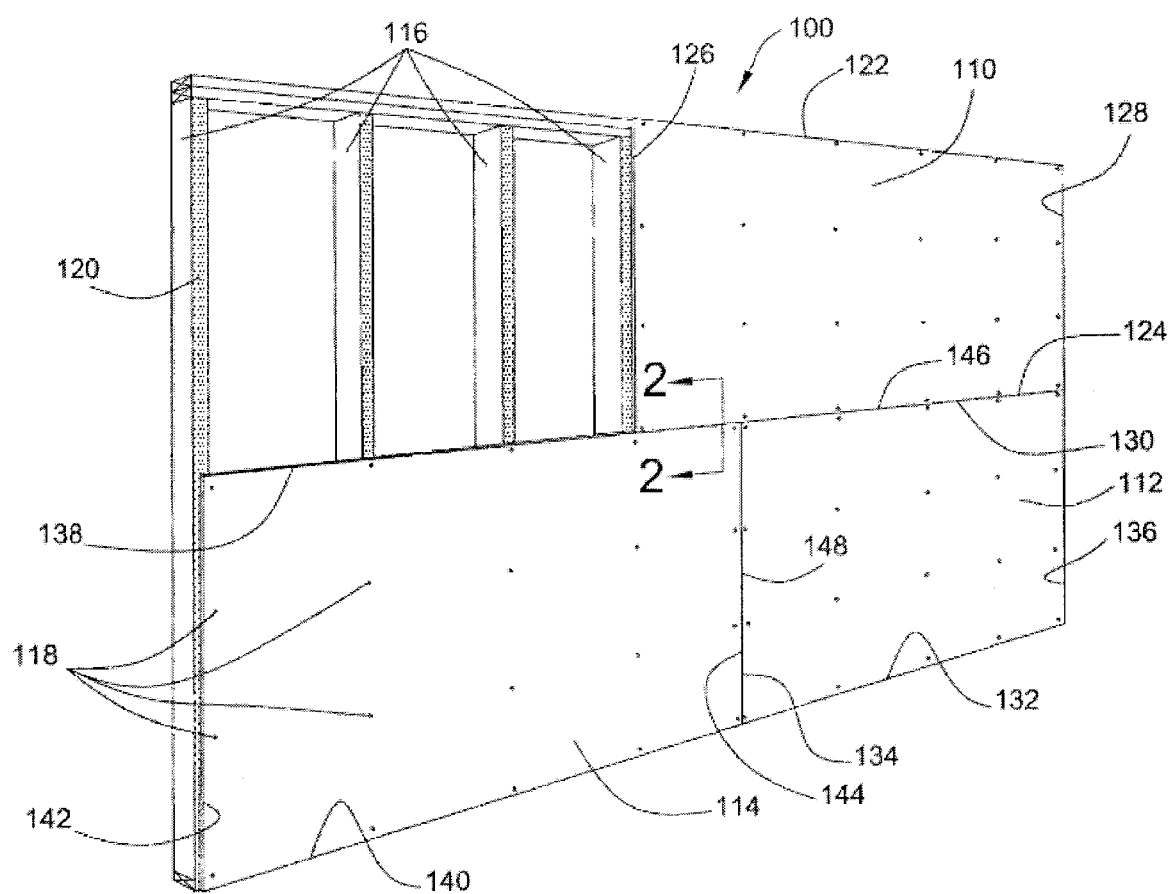
FIG. 1 is a perspective view of a wall assembly.

Reference is now made to the figures to depict advantageous illustrative embodiments of the invention. FIG. 1 depicts a wall assembly 100 comprising three boards 110, 112, and 114 which are affixed to framing members 116 by way of fasteners 118. Any suitable cladding can be used as the board. For example, gypsum board normally comprises a core comprising an interlocking matrix of crystalline gypsum with desired additives such as polyphosphate, starch, dispersant, accelerator, retarder, etc., between two cover sheets in a sandwich structure. The core can optionally comprise a skim coat disposed on a core surface facing one or both cover sheets. The invention is not limited with respect to the techniques for manufacturing the cladding, and the board can be made in any suitable manner as known in the art.

The framing members 116 are desirably provided with adhesive 120 to promote adhesion to the boards 110, 112, and 114 and to allow the use of fewer fasteners 118 than are used in conventional systems. Since fasteners need to be covered by joint compound, reducing the number of fasteners is thereby advantageous in terms of efficiency, ease, and quality of installation.

Board edges are generally identified as being in the machine direction or cross direction based on how the board is made on the manufacturing line. Edges along the machine direction are normally the longer edges and are usually wrapped with cover sheet (e.g., made of paper) during board manufacture in which a cementitious slurry is deposited on a moving cover sheet (e.g., on a conveyor) to initially form a long, continuous ribbon of board precursor, which is eventually cut in the cross direction to desired dimensions as known in the art (e.g., 4'×8'; 4'×10'; 4'×12'; etc., although different widths and lengths are possible, including 36 inch wide board, or 54 inch wide board). For example, board 110 has machine direction edges 122 and 124 and cross-machine edges 126 and 128. Similarly, board 112 has machine direction edges 130 and 132 and cross-machine edges 134 and 136, while board 114 has machine direction edges 138 and 140 and cross-machine edges 142 and 144. As discussed in FIGS. 2A and 2B below, the machine edges are typically tapered. The cut cross-machine edges are normally not tapered.

Two boards can meet in various configurations to form a seam, often referred to as a joint. Since machine edges are tapered while cross machine joints are not tapered, the nature of the joints will vary depending on which edges of the boards meet. When a machine direction edge of one board meets a machine direction board of another board, a machine direction joint is formed where two tapers meet to form a recess. When a cross direction edge of one board meets a cross direction edge of another board, a butt joint, without tapers, is formed. As seen in FIG. 1, boards 110 and 112 join to form a machine direction joint 146, and boards 112 and 114 join to form a butt joint 148.

Figure 2A:
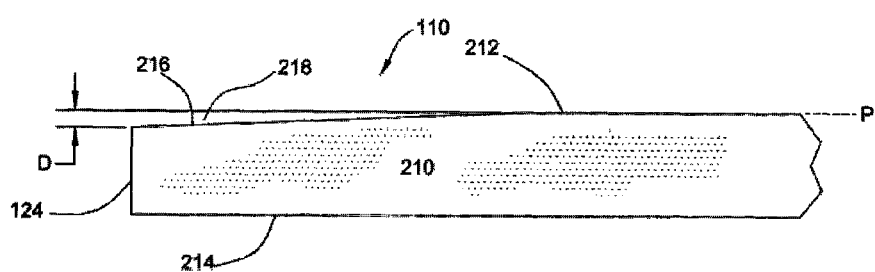
Figure 2B:
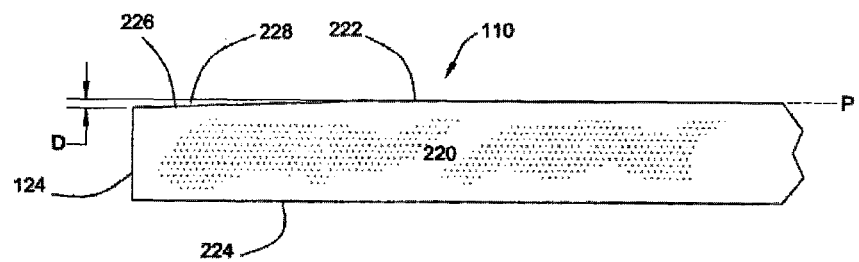

To illustrate the tapered edges in the machine direction of board, reference is made to FIGS. 2A and 2B, which are sectional views, illustrating alternate depths for the taper from board 110. A board core 210 has a top surface 212 and bottom surface 214. Normally a top cover sheet facing top surface 212 wraps around machine edge 124 and meets a bottom paper which faces bottom surface 214. It will be understood that the sandwich structure of board 110 with core 210 between two cover sheets is typically formed upside down such that the top surface 212 is on the bottom. If desired, during manufacture, the board can be flipped prior to entry into a kiln for drying excess water. The core 210 can optionally comprise skim coats as known in the art, e.g., on top surface 212 and/or bottom surface 214.

FIG. 2A shows a conventional taper 216 with a significant depth (D) for thereby defining a recess 218. Since conventional joint compound is susceptible to significant shrinkage, the depth (D) is large to accommodate receiving copious amounts of joint compound in recess 218 for embedding joint tape therein to compensate for the shrinkage upon drying. The taper with substantial depth (D) is further designed to assist the user by reducing the height above the plane of the board in which additional coats of joint compound are manipulated in conventional systems. For example, conventional tapers can define a recess depth of about 0.08 inch at the deepest point. Even with such conventional depth (D) on the taper, the user must still undesirably manipulate joint compound considerably high above the plane of the board.

FIG. 2B illustrates an alternate taper in accordance with embodiments of the invention. A board core 220 has a top surface 222 and bottom surface 224. Normally a top cover sheet facing top surface 222 wraps around machine edge 124 and meets a bottom paper which faces bottom surface 224. The core 220 can optionally comprise skim coats as known in the art, e.g., on top surface 222 and/or bottom surface 224. During manufacture, the board can be formed upside down initially and flipped as desired as described above.

As seen in FIG. 2B, the taper 226 has a depth (D) that is considerably smaller than what is conventional, as shown in FIG. 2A. Such a taper 226 defines a recess 228 which is smaller than conventional and is particularly useful with low shrinkage joint compound in accordance with embodiments of the invention. In some embodiments, no taper is provided even in the machine direction such that the board has a square edge (i.e., D=zero). Thus, since no taper is possible in various embodiments, the taper 226 can define a recess depth at the deepest point from about 0 inch to about 0.05 inch, e.g., from about 0 inch to about 0.04 inch, 0 inch to about 0.03 inch, 0 inch to about 0.02 inch, 0 inch to about 0.015 inch, 0.005 inch to about 0.05 inch, 0.005 inch to about 0.04 inch, 0.005 inch to about 0.03 inch, 0.005 inch to about 0.02 inch, 0.005 inch to about 0.015 inch, 0.01 inch to about 0.05 inch, 0.01 inch to about 0.04 inch, 0.01 inch to about 0.03 inch, 0.01 inch to about 0.02 inch, etc.

Figure 3A:
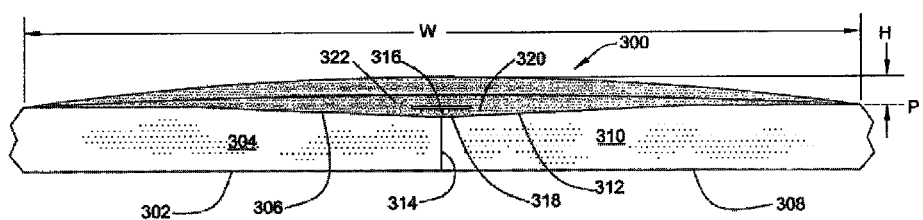
Figure 3B:
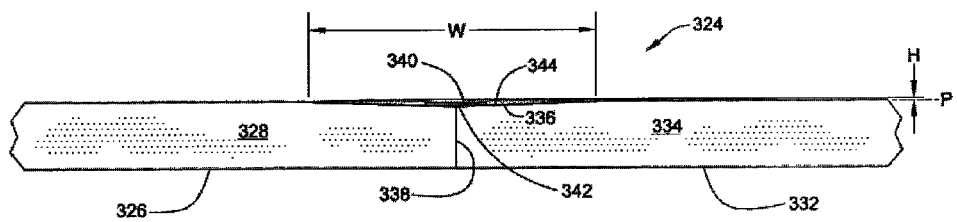
Figure 3C:
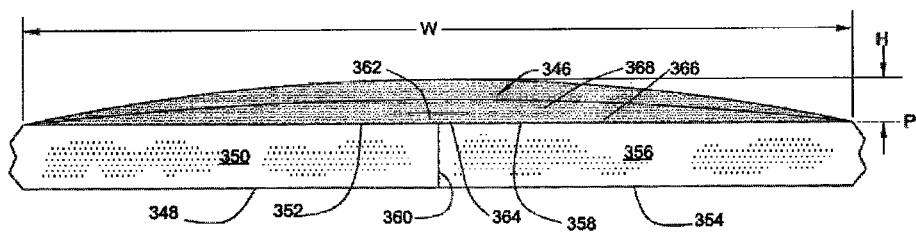
Figure 3D:
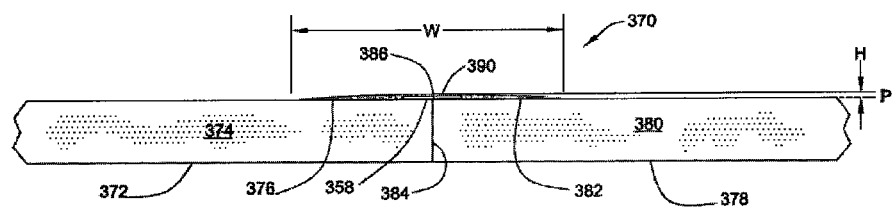

FIGS. 3A-3D are sectional views, illustrating different arrangements for level 4 finishing of a joint between two wallboards. Particularly, FIGS. 3A and 3B illustrate a joint between two tapered boards (e.g., boards adjoining along machine direction) where FIG. 3A illustrates a conventional system with multiple coats of joint compound for comparative purposes, and FIG. 3B illustrates one coat of joint compound in accordance with embodiments of the invention. FIGS. 3C and 3D illustrate a joint where two square edges meet without taper (e.g., in a butt joint or machine direction joint without taper). In this respect, FIG. 3C illustrates a conventional multi-coat system for comparative purposes while FIG. 3D illustrates application of one coat of joint compound in accordance with embodiments of the invention. While board cores are shown, it will be understood that cover sheets can be applied as described above.

In FIG. 3A, a board assembly 300 comprises a first board 302 having a core 304 and a tapered edge 306. A second board 308 comprises a core 310 and tapered edge 312. Tapered edges 306 and 312 meet to form a tapered joint 314. Tape 316 is applied over joint 314. Conventional systems require a joint compound layer 318 for embedding tape 316 over joint 314. Conventional dispensing tools can be used to dispense tape 316 and joint compound layer 318 together. After allowing joint compound layer 318 to dry, a joint compound second layer 320 is applied over the tape 316. Then, after the second layer 320 dries, a joint compound third layer 322 is applied over second layer 320. The three layers of joint compound 318, 320, and 322 are required in conventional systems to compensate for the significant shrinkage resulting from conventional joint compound chemistry.

FIG. 3B depicts a one-coat system in accordance with illustrative embodiments of the invention. A board assembly 324 comprises a first board 326 having a core 328 and tapered edge 330. A second board 332 comprises a core 334 and tapered edge 336. It will be understood that the tapered edges 330 and 336 both can have a smaller slope than conventional tapered edges 306 and 312 depicted in FIG. 3A and as described in relation to FIG. 2B above. Tapered edges 306 and 312 meet to form a tapered joint 338. Tape 340 can be applied over joint 338 by way of adhesive 342. The adhesive 342 can be in any suitable arrangement relative to tape 340, but in some embodiments the adhesive is on a bottom surface of the tape 340 and is optionally protected by adhesive liner. The adhesive can be any suitable adhesive, e.g., applied by pressure (such as by hand, knife, roller or other device). Unlike the conventional arrangement illustrated in FIG. 3A, only one joint compound layer 344 is required as shown in FIG. 3B.

FIGS. 3C-3D illustrate alternate embodiments for a square edged joint (i.e., without taper) as might be used in a butt joint or square edged machine direction joint. In FIG. 3C, a board assembly 346 comprises a first board 348 having a core 350 and a straight edge 352. A second board 354 comprises a core 356 and straight edge 358. Straight edges 352 and 358 meet to form a square edged joint 360. Tape 362 is applied over joint 360. Conventional systems require a joint compound layer 364 for embedding tape 362 over joint 360. As noted above, conventional dispensing tools can be used to dispense tape 362 and joint compound layer 364 together. After allowing joint compound layer 364 to dry, a joint compound second layer 366 is applied over the tape 362. Then, after the second layer 366 dries, a joint compound third layer 368 is applied over second layer 366. The three layers of joint compound 318, 320, and 322 compensate for the significant shrinkage in conventional joint compounds.

FIG. 3D depicts a one-coat system for square joint in accordance with illustrative embodiments of the invention. A board assembly 370 comprises a first board 372 having a core 374 and straight edge 376. A second board 378 comprises a core 380 and straight edge 382. Straight edges 376 and 382 meet to form a square edge joint 384. Tape 386 can be applied over joint 384 by way of adhesive 388. The adhesive 388 can be in any suitable arrangement relative to tape 386, but in some embodiments the adhesive is on a bottom surface of the tape 386 and is optionally protected by adhesive liner. The adhesive can be any suitable adhesive, e.g., applied by pressure. Unlike the conventional arrangement illustrated in FIG. 3C, only one joint compound layer 390 is required as shown in FIG. 3D.

Conventional systems, as shown in FIGS. 3A and 3C, require the three layers of joint compound (318, 320, and 322) and (364, 366 and 368) which results in the user having to manipulate the joint compound significantly above the plane (P) of the board at a height (H) as shown. The height (H) is even more extreme in squared edged embodiments (as are typical with respect to butt joints) such as shown in FIG. 3C, inasmuch as there is no taper below the plane (P) of the board to receive some compound. For example, the height (H) of conventional systems can be, at least about 0.1 inch, e.g., at least about 0.125 inch or higher. The user must have significant skill to manipulate the compound to appear flat to the naked eye when functioning that high above the plane of the board. Typically, the joint compound is progressively feathered further and further away from the joint 314 or 360, respectively. Because of the significant height (H), the feathering is at a substantial width (W) as shown to give the visual appearance of a flat covered joint. For example, the width (W) of conventional embodiments as shown in FIGS. 3A and 3C can be at least about 30 inches, e.g., about 36 inches or more in conventional systems.

The inventive embodiments illustrated in FIGS. 3B and 3D advantageously result in smaller height (H) and width (W) for depositing and feathering the joint compound as compared with the (H) and (W) for the corresponding conventional arrangements set forth in FIGS. 3A and 3C, respectively. This is because the user is not required to function as high above the plane (P) of the board and thusly does not need to feather the compound layer 344 and 390, respectively, as far wide as in the conventional systems of FIGS. 3A and 3C. For example, the height (H) in some inventive embodiments can be under 0.1 inch and, preferably, the height (H) is under 0.7 inch, such as about 0.0625 inch or less or about 0.05 inch or less (e.g., 0.02 inch to about 0.1 inch, 0.02 inch to about 0.07 inch, 0.02 inch to about 0.0625 inch, about 0.02 inch to about 0.05 inch, about 0.05 inch to about 0.1 inch, about 0.05 inch to about 0.07 inch, about 0.05 inch to about 0.0625 inch, etc.). Similarly, the width (W) of embodiments of FIGS. 3B and 3D for feathering the joint compound 344 and 390, respectively, can be considerably smaller than the width (W) of corresponding conventional systems (e.g., as shown in FIGS. 3A and 3C). For example, the smaller width (W) of advantageous embodiments of the invention can be about 20 inches or smaller, such as about 18 inches or smaller, 15 inches or smaller, 12 inches or smaller (e.g., about 5 inches to about 20 inches, about 5 inches to about 15 inches, about 5 inches to about 12 inches, about 5 inches to about 10 inches, etc.).

Figure 4A:
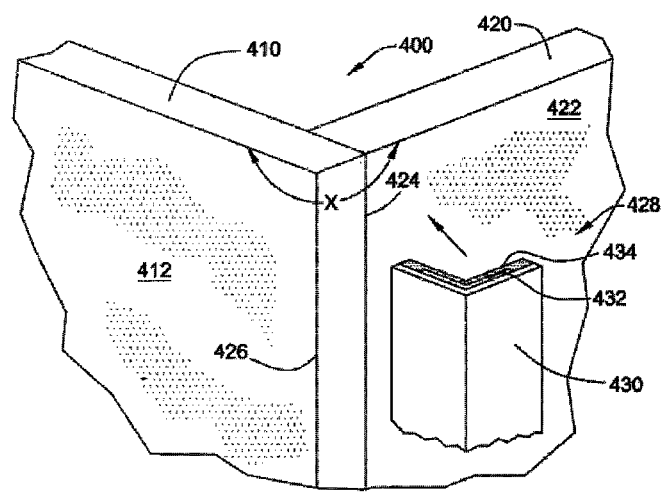
Figure 4B:
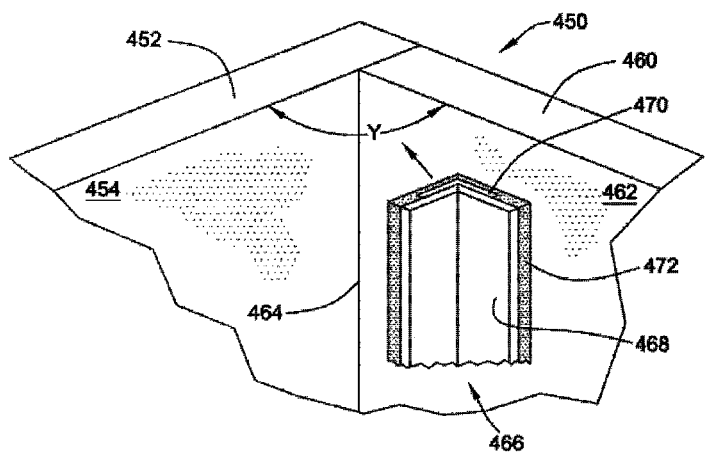

FIGS. 4A and 4B depict illustrative embodiments for treating seams where boards meet at an angle, e.g., to form a wall corner. Corner angle reinforcement trim can define and reinforce the corner angles, provide continuity between intersecting gypsum board planes, and conceal gypsum panel corner seams when covered with compound. For example, to illustrate an outside corner, FIG. 4A depicts a wall assembly 400 comprising a first board 410 having a face 412. A second board 420 has face 422. The boards 410 and 420 meet at an angle to form a corner seam 424 adjacent to a face edge 426 of board 410. The angle (x) is defined by the intersection of the faces 412 and 422 in what is understood in the art as an outside angle forming an outside corner. The outside angle can be any suitable angle depending on the wall configuration and dimensions as understood in the art. Typically, the angle (x) is a reflex angle as shown in FIG. 4A, i.e., an angle exceeding 180°, although smaller angles are possible in more unique corners. For example, in some embodiments, the angle (x) can be in a range of, e.g., from about 180° to about 300°, including angles near 270°, such as from about 230° to about 330°, from about 250° to about 310°, about 260° to about 300°, about 260° to about 280°, about 265° to about 275°, or about 268° to about 272°.

As seen in exploded view of FIG. 4A, a reinforcement trim 428 is applied over the outside corner seam 424 and face edge 426 to cover and protect the edge 426 and seam 424. Trim 428 comprises a trim face 430 with reinforcement backing 432, which has a width that does not extend as far as the width of the trim face 430 in some embodiments. Adhesive 434 is used to apply the trim 428 over the outside corner seam 424 and face edge 426. Joint compound, including one coat joint compound in accordance with embodiments of the invention, is applied over the trim to hide the trim and seam. After it is applied and dried, the compound can be sanded and painted to provide a uniform aesthetic appearance.

To illustrate an inside corner, FIG. 4B depicts a wall assembly 450 comprising a first board 452 having a face 454. A second board 460 has face 462. The boards 452 and 460 meet at an angle to form a corner seam 464. The angle (y) is defined by the intersection of the faces 454 and 462 in what is understood in the art as an inside angle forming an inside corner. The inside angle can be any suitable angle depending on the wall configuration and dimensions as understood in the art. Typically, the angle (y) is an angle below 180°, although larger angles are possible in more unique corners. For example, in some embodiments, the angle (y) can be in a range of e.g., about 30° to about 180° or from about 45° to about 135°, including angles near 90°, such as from about 60° to about 120°, about 70° to about 110°, about 80° to about 100°, about 85° to about 95°, or about 88° to about 92°.

As seen in exploded view of FIG. 4B, a reinforcement trim 466 is applied over the inside corner seam 464 to cover and protect the seam 464. Trim 466 comprises a trim face 468 with reinforcement backing 470, which has a width that does not extend as far as the width of the trim face 468 in some embodiments. Adhesive 472 is used to apply the trim 466 over the seam 464. Joint compound, including one coat joint compound in accordance with embodiments of the invention, is applied over the trim to hide the trim and seam. After it is applied and dried, the compound can be sanded and painted to provide a uniform aesthetic appearance.

The trim face 430 or 468 desirably comprises non-swelling paper (natural or synthetic) in some embodiments. The non-swelling paper is particularly desirable in one coat systems since less compound will go over the paper and disguise any unwanted swelling that might lead to bulging or other unsightly results. For example, in some embodiments, the face 430 or 468 has a dimensional stability of less than about 0.4% machine direction (MD) expansion and less than about 2.5% cross machine direction (CD) expansion (e.g., less than about 0.3% MD expansion, and less than about 1.5% CD expansion, such as less than about 0.2% MD expansion, and less than about 1% CD expansion after 30 minute immersion in water, ASTM C474-05, Section 12. It will be understood that embodiments that pass testing relative to ASTM C474-05 can also exceed the minimum performance specifications established in ASTM C475/C475M-12 Standard Specification for Joint Compound and Joint Tape for Finishing Gypsum Board.

In some embodiments, the face 430 or 468 has a thickness from about 0.01 inches (≈0.0254 cm) to about 0.125 inches (≈0.318 cm), such as from about 0.05 inches (≈0.127 cm) to about 0.0625 (≈159 cm). It will be understood that the joint tape can be composed of the same materials, characteristics, and properties as the reinforcement trim face.

The backing 432 or 470 for the reinforcement trim 428 or 466 can comprise any suitable material that provides strength to the trim composite. The backing material is useful to reduce, control, or eliminate seam cracking in the wall angles when new construction framing shifts and minor wall displacement occurs. The backing material also, in conjunction with the facing material, serves the function of forming a true and straight angle line along the vertex where two walls join or intersect at an angle. For example, the trim backing 432 or 470 can comprise a composite laminated structure, layered paper (synthetic or natural), thermoplastic, thermoset, natural or synthetic fiber, carbon fiber, polyester, polycarbonate, fiberglass, non-woven natural or synthetic materials, woven natural or synthetic materials, spun polyolefin, or metals such as steel, e.g., electro-galvanized and/or hot dipped galvanized, zinc phosphate treated and/or dried in place chromate sealer, and/or other treated or coated metal and the like. For example, in one illustrative embodiment, the backing 432 or 470 is formed of galvanized steel. The trim backing 432 or 470 desirably has any suitable thickness, e.g., a thickness of at least about 0.010, e.g., about 0.012 inches (≈0.030 cm) to about 0.0625 inches (≈0.159 cm), such as from about 0.012 inches to about 0.030 inches (≈0.0762 cm). In some embodiments of backing material, such as when galvanized steel is used, the backing typically imparts a Rockwell hardness scale B from about 45 to about 85, such as from about 55 to about 65, when measured according to ASTM E18-03.

Preparation of trims is illustrated in embodiments with non-swellable paper face with galvanized steel backing. The trims are prepared by running flat steel (on a spool) through a series of progressive dies and the facing material and metal backing are introduced just after the last set of dies. The facing and backing can be hot-melt glued together in some embodiments. Other techniques for forming reinforcement trims formed from a variety of materials will be apparent to one of skill in the art.

Figure 5:
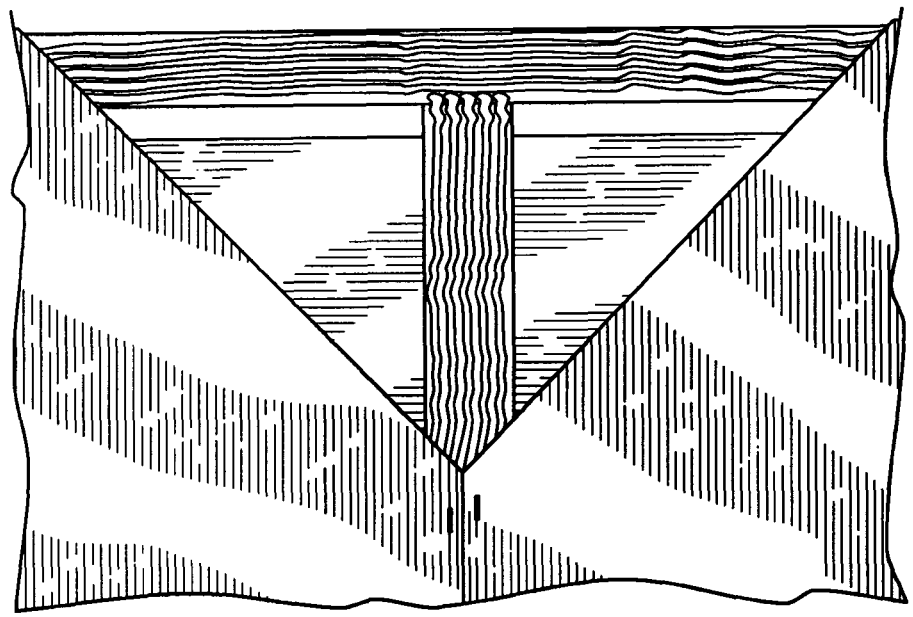
FIG. 5 illustrates two adjoining boards affixed to a framing skeleton, wherein the V-shaped cut away shows the presence of adhesive on framing members in accordance with embodiments of the invention.
Figure 6:
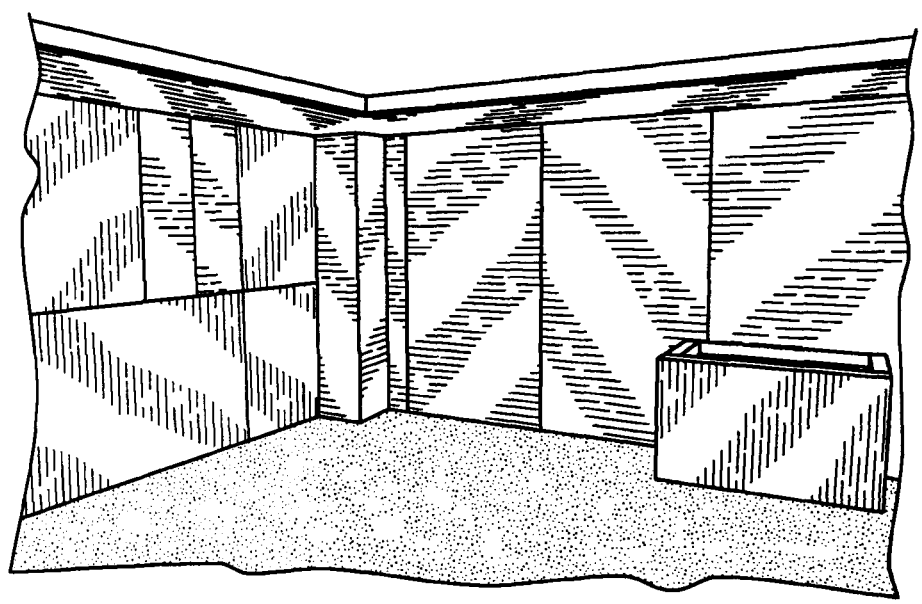
FIGS. 6-7 illustrate installations of wall assemblies, where
Figure 7:
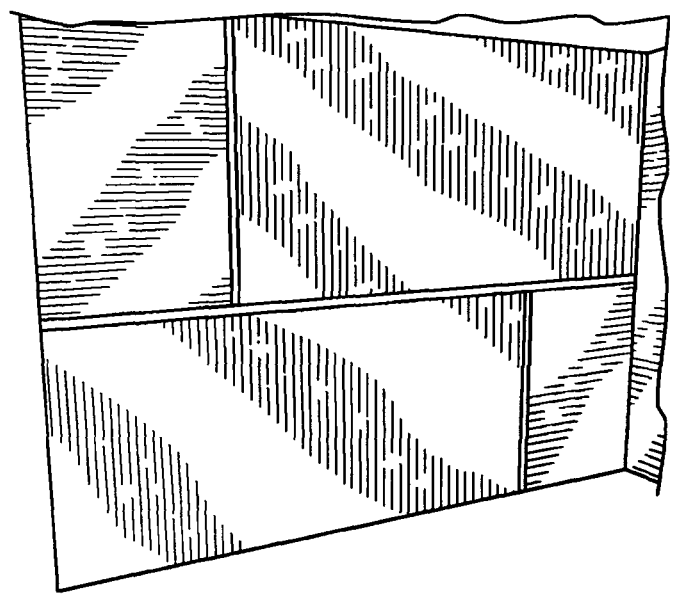

FIGS. 5-18 are photographic images depicting various illustrative embodiments of the invention. In particular, FIG. 5 shows a cut away of board to reveal panel adhesive applied to framing. FIG. 6 depicts a room installation after painting. As seen in FIG. 6, a finished wall installation in accordance with embodiments of the invention can achieve a level 4 drywall finish with one coat of joint compound and without the need for multiple coats of joint compound as in conventional systems. In addition, FIG. 7 depicts joint tape that has been adhesively applied over the seams of gypsum panels before the gypsum panels are treated with joint compound.

Figure 8:
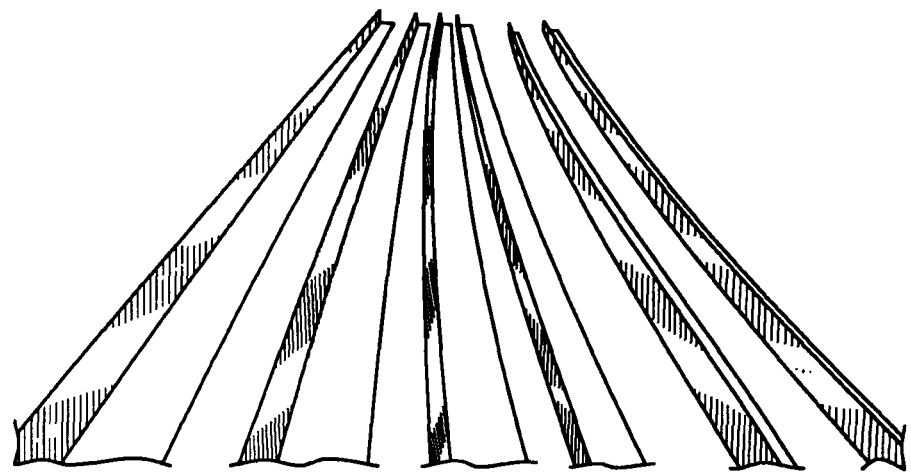
FIG. 8 illustrates taped joints prior to depositing joint compound.
Figure 9:
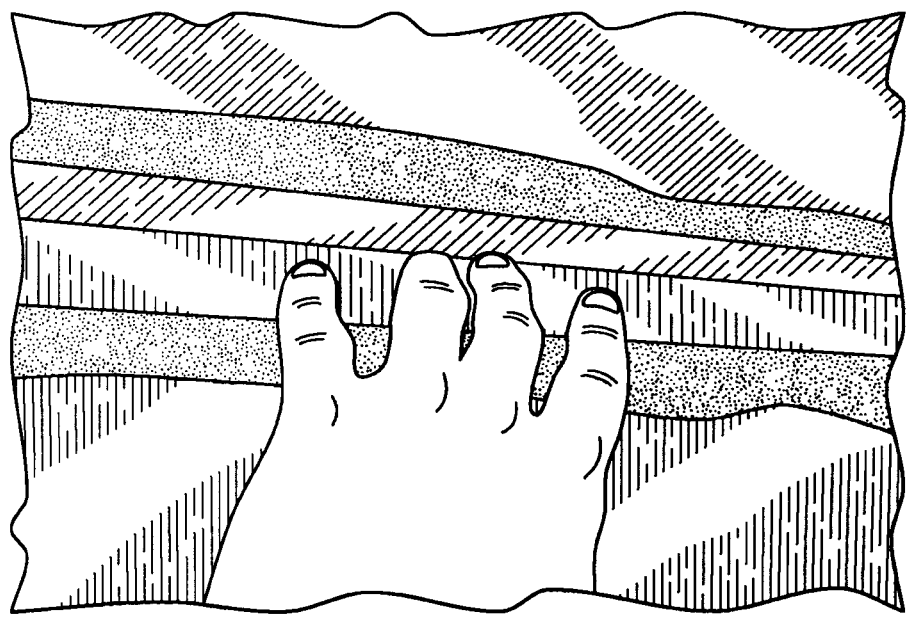
FIG. 9 depicts corner reinforcement trim being affixed to an inside corner with a pressure adhesive in accordance with embodiments of the invention.
Figure 10:
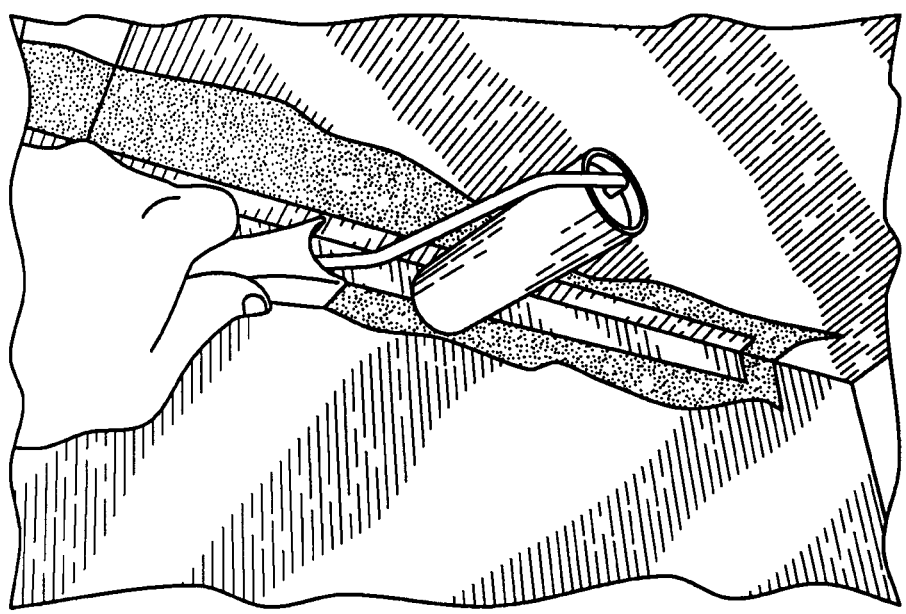
FIGS. 10-11 depict seating reinforcement trip into corners with a roller device in accordance with embodiments of the invention.
Figure 11:
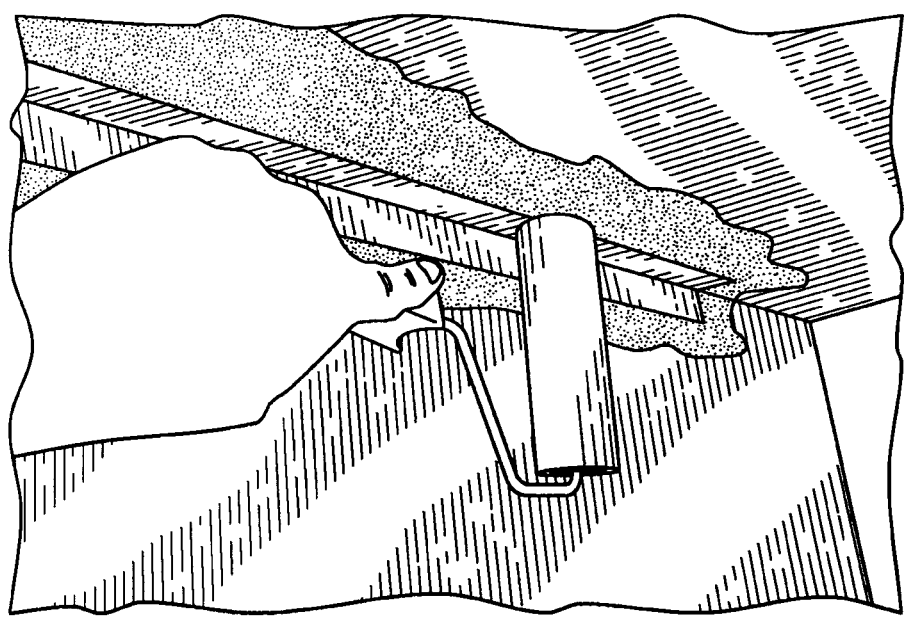
Figure 12:
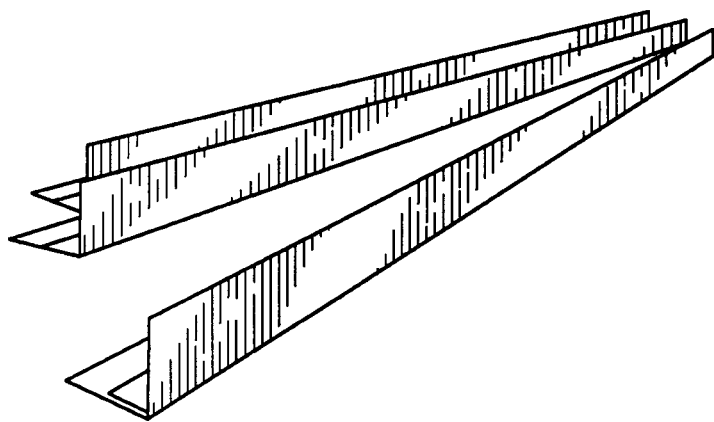
FIG. 12 depicts corner reinforcement trims in accordance with embodiments of the invention.
Figure 13:
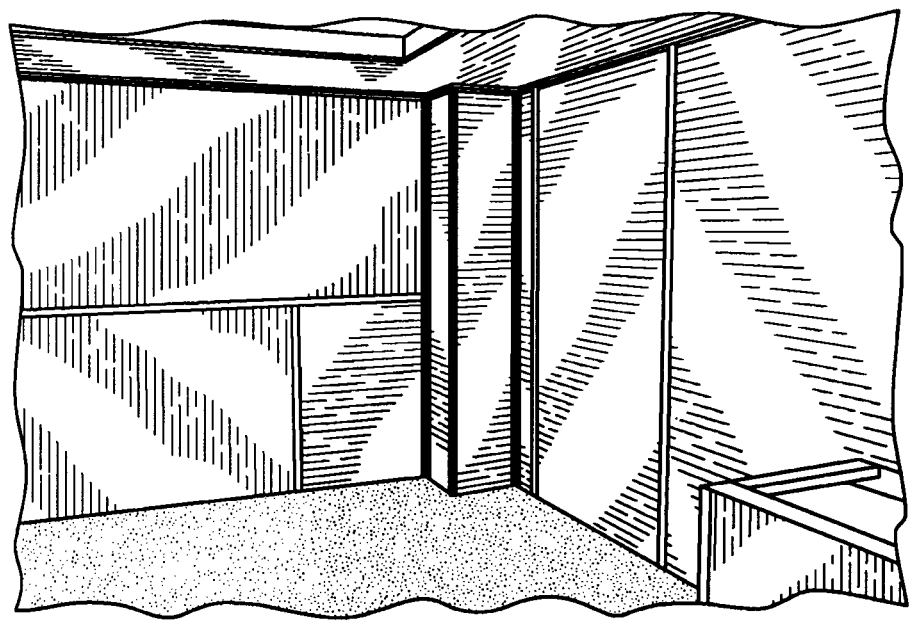
FIG. 13 depicts wall assemblies showing corner reinforcement trims installed on inside and outside corners in accordance with embodiments of the invention.
Figure 14:
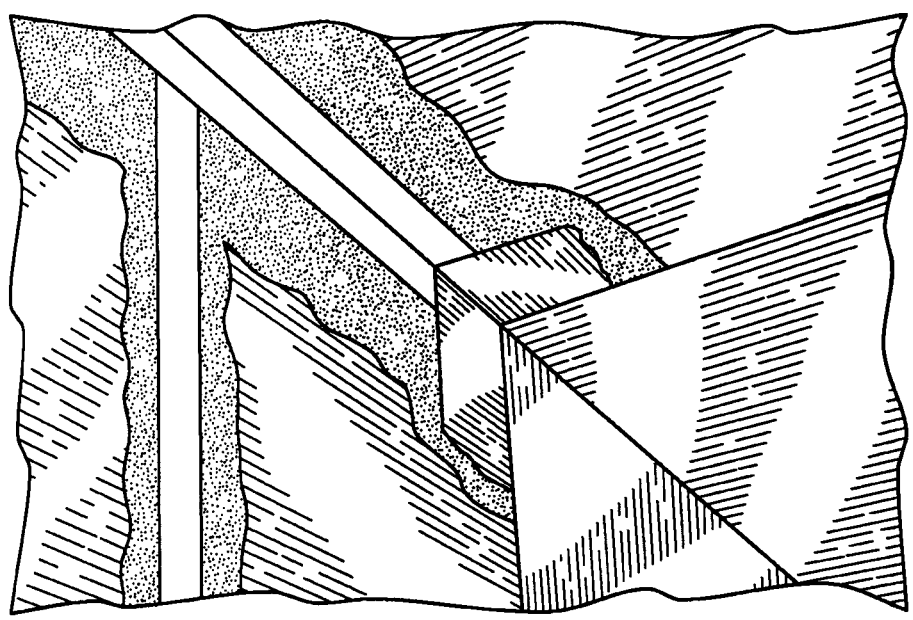
FIG. 14 depicts a reinforcement trim for an inside corner with one coat of joint compound in accordance with embodiments of the invention.

With respect to inside and outside corner installation, FIG. 8 depicts outside corner trims that are fabricated with non-swellable paper face with metallic backing. Meanwhile, FIG. 9 depicts an inside corner reinforcement trim with non-swellable paper face and metal backing being hand pressed into place. FIGS. 10-11 depict application of trim embodiments of the invention using a roller. FIG. 12 depicts outside corner trim pieces. FIG. 13 depicts a room installation with all inside and outside corner trims and flat joint tape installed. FIG. 14 depicts flat joint tape on the inside corner trim on the upper left-hand corner of the image. The lower right-hand corner of the image depicts one coat of joint compound applied to provide a level 4 drywall finish in accordance with embodiments of the invention.

Figure 15:
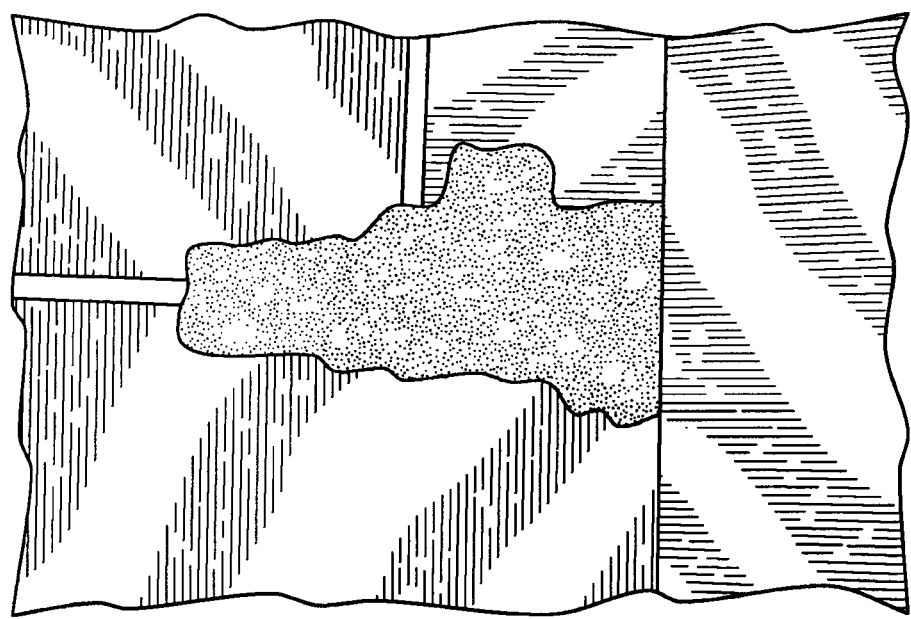
FIG. 15 depicts a sanded one-coat finish both for a joint in the machine (horizontal, as shown) direction and for a butt joint (vertical, as shown) in accordance with embodiments of the invention.
Figure 16:
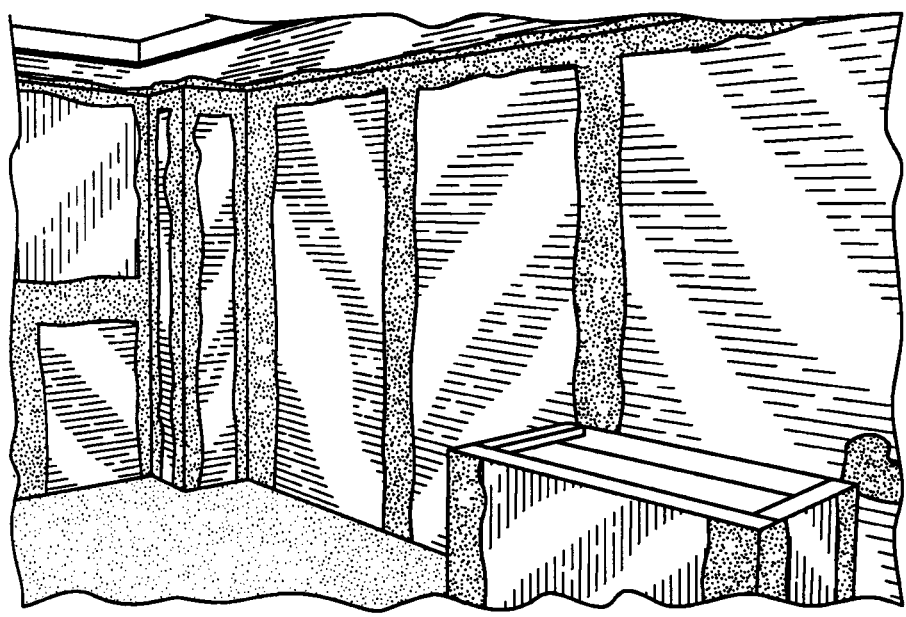
FIG. 16 depicts wall assembly installation with joint treatment applied.
Figure 17:
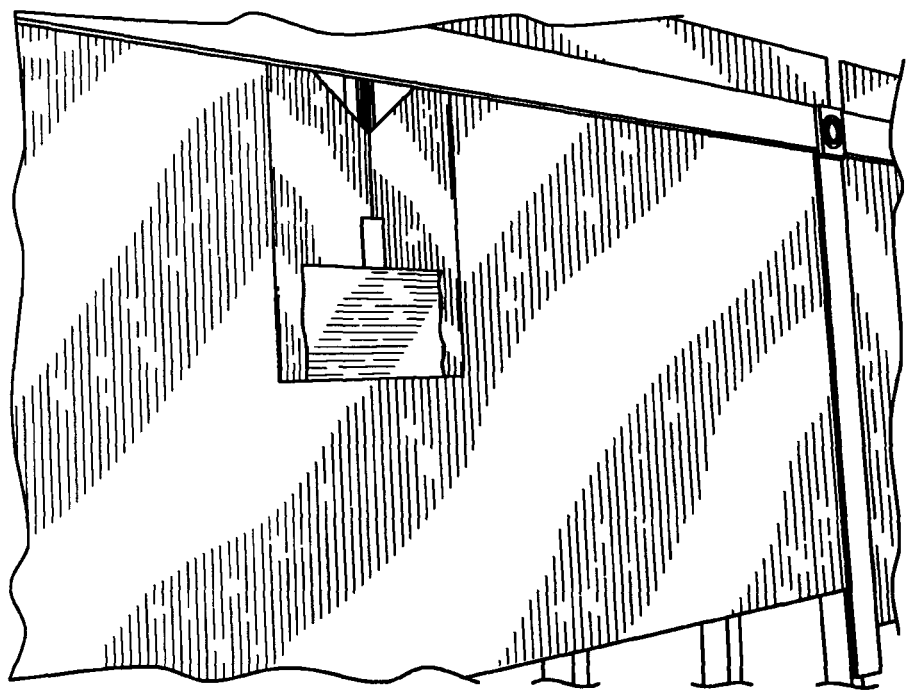
FIG. 17 depicts a treated-wall assembly with a V cut to show framing member with adhesive and one coat of joint compound illustrating narrow feathering in accordance with embodiments of the invention.
Figure 18:
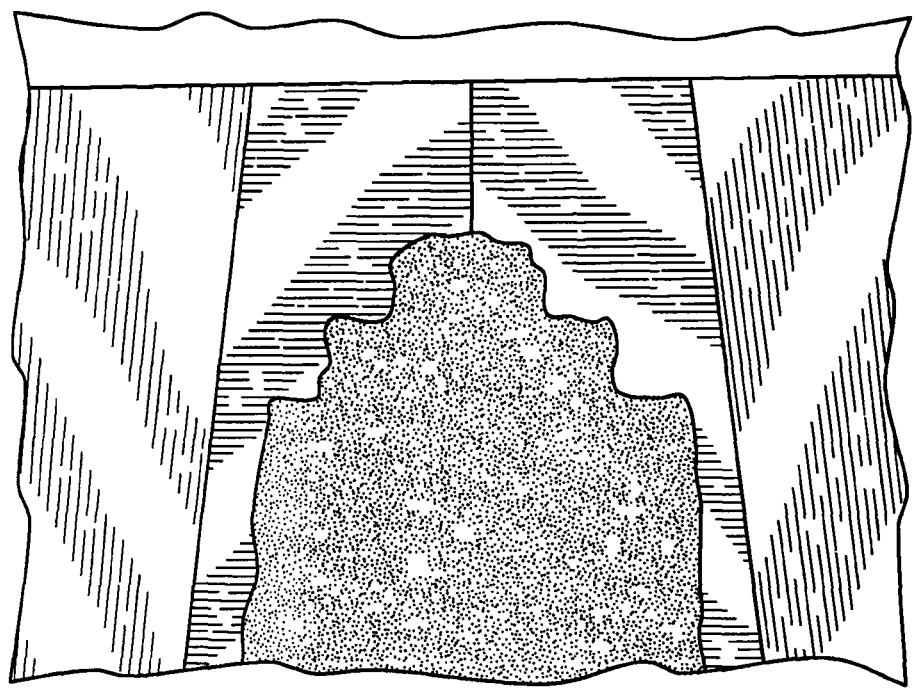
FIG. 18 depicts a conventional joint treatment system with joint tape embedded in joint compound with two additional joint compound applications over the tape requiring a wide feathering of the joint compound for comparison purposes.

FIG. 15 depicts flat joint tape with one coat of joint compound applied on the left side of the image. It can be seen that a butt joint (cross machine joint) without taper has been concealed with application of one coat of joint compound and then sanding. The right side of the image depicts the finished painted look. FIG. 16 depicts a room installation with joint treatment installed while FIG. 17 depicts a finished wall cutaway to reveal panel adhesive applied to framing with tape and one coat of joint treatment. Furthermore, FIG. 18 depicts a gypsum board with conventional level 4 drywall finish with only a 12 inch wide feathering in accordance with embodiments of the invention.

In these and other embodiments, joint compound composition in accordance with the present invention comprising (a) binder, (b) hollow spheres (sometimes referred to as bubbles) having an average isostatic crush strength of at least about 100 psi (e.g., at least about 250 psi) as measured according to ASTM D 3102-78, and optionally other ingredients. Preferably, the joint compound composition exhibits low shrinkage. For example, in some embodiments, the joint compound composition exhibits a shrinkage of about 10% or less by volume, e.g., about 7% or less, such as about 5% or less, about 2% or less, about 1% or less, about 0.1% or less, or about zero (no shrinkage) as measured by ASTM C474-05, Section 6.

The joint compound can have any suitable density, but preferably is an ultra lightweight composition having a density of about 10 lb/gal or less, such as about 8 lb/gal or less. For example, in some embodiments, the joint compound has a density from about 2 lb/gal (≈240 kg/m$^3$) to about 8 lb/gal (≈960 kg/m$^3$) (preferably from about 2 lb/gal to about 6 lb/gal (≈720 kg/m$^3$), more preferably about 3 lb/gal (≈360 kg/m$^3$) to about 4 lb/gal (≈480 kg/m$^3$)).

Generally, the composition is a drying type joint compound, wherein the compound hardens by evaporation of water. Thus, in some embodiments, the joint compound composition is substantially free of setting-type materials such as calcined gypsum, cement, or other hydraulically setting materials. Furthermore, in some embodiments, the joint compound composition can desirably be substantially free of raw materials such as bulk filler, clays, starch, or mica; including such examples as calcium carbonate, expanded perlite, calcium magnesium carbonate, limestone, calcium sulfate dihydrate, a gelling clay such as attapulgite clay, a delaminated clay, such as kaolin clay, talcs, and diatomaceous earth. Furthermore, the joint compound composition can desirably be substantially free of any combination of the aforementioned raw materials.

As used herein, "substantially free" of such setting minerals, bulk filler, clays, starch, mica, or a combination thereof means that the joint compound composition contains either (i) 0 wt. % based on the weight of the composition, or no such setting minerals, bulk filler, clays, starch, mica, or a combination thereof, or (ii) an ineffective or (iii) an immaterial amount of such setting minerals, bulk filler, clays, starch, mica, or a combination thereof. An example of an ineffective amount is an amount below the threshold amount to achieve the intended purpose of using such setting minerals, bulk filler, clays, starch, mica, or a combination thereof as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. % as one of ordinary skill in the art will appreciate. However, if desired in alternative embodiments, such ingredients can be included in the joint compound composition.

In alternative embodiments, bulk filler (e.g., calcium carbonate or limestone) or delaminated clay, such as kaolin clay may be present. These raw materials can be added, in some embodiments, to tailor the joint compound for the subjective feel desired by the end user during the application process. These raw materials, as used herein, do not otherwise change the physical properties of the joint compound. In such embodiments, up to about 40 wt. % of bulk filler, such as calcium carbonate or limestone, can be included. If included, in some embodiments, the bulk filler can be present, for example, in an amount of up to about 35 wt. %, up to about 30 wt. %, up to about 25 wt. %, up to about 20 wt. %, up to about 15 wt. %, up to about 10 wt. %, up to about 5 wt. %, or up to about 1 wt. % added based on the weight of the wet composition. Each of the aforementioned endpoints can have a lower limit, e.g., ranging from 1 wt. %, 5 wt. %, 10 wt. %, 15 wt. %, 20 wt. %, 25 wt. %, 30 wt. %, or 35 wt. %, as numerically appropriate.

For example, in various embodiments, the bulk filler can be present from about 1 wt. % to about 40 wt. %, e.g., from about 1 wt. % to about 30 wt. %, from about 1 wt. % to about 25 wt. %, from about 1 wt. % to about 20 wt. %, from about 1 wt. % to about 15 wt. %, from about 1 wt. % to about 10 wt. %, from about 5 wt. % to about 30 wt. %, from about 5 wt. % to about 25 wt. %, from about 5 wt. % to about 20 wt. %, from about 5 wt. % to about 15 wt. %, from about 5 wt. % to about 10 wt. %, from about 10 wt. % to about 30 wt. %, from about 10 wt. % to about 25 wt. %, from about 10 wt. % to about 20 wt. %, from about 15 wt. % to about 30 wt. %, from about 15 wt. % to about 25 wt. %, or from about 20 wt. % to about 30 wt. %.

If included, delaminated clay, such as kaolin clay, may be present in some embodiments, for example, in an amount up to about 5 wt. %, up to about 4.5 wt. %, up to about 4 wt. %, up to about 3.5 wt. %, up to about 3 wt. %, up to about 2.5 wt. %, up to about 2 wt. %, up to about 1.5 wt. %, up to about 1 wt. %, up to about 0.5 wt. %, or up to about 0.1 wt. % added based on the weight of the wet composition. Each of the aforementioned endpoints can have a lower limit, e.g., ranging from 0.1 wt. %, 0.5 wt. %, 1 wt. %, 1.5 wt. %, 2 wt. %, 2.5 wt %, 3 wt. %, 3.5 wt. %, 4 wt. %, or 4.5 wt. %, as numerically appropriate.

For example, in various embodiments, delaminated clay, such as kaolin clay, can be present from about 0.1 wt. % to about 5 wt. %, e.g., from about 0.1 wt. % to about 4 wt. %, from about 0.1 wt. % to about 3 wt. %, from about 0.1 wt. % to about 2 wt %, from about 0.1 wt. % to about 1 wt. %, from about 0.1 wt. % to about 0.5 wt. %, from about 0.5 wt. % to about 5 wt. %, from about 0.5 wt. % to about 4 wt. %, from about 0.5 wt. % to about 3 wt. %, from about 0.5 wt. % to about 2 wt. %, from about 0.5 wt. % to about 1 wt. %, from about 1 wt. % to about 5 wt. %, from about 1 wt. % to about 4 wt. %, from about 1 wt. % to about 3 wt. %, from about 1 wt. % to about 2 wt. %, from about 2 wt. % to about 5 wt. %, from about 2 wt. % to about 4 wt. %, from about 2 wt % to about 3 wt. %, from about 3 wt. % to about 5 wt. %, from about 3 wt. % to about 4 wt. %, or from about 4 wt. % to about 5 wt. %.

Any suitable binder can be used to achieve desired joint compound in accordance with aspects of the invention. Desired binders hold particles in composition together and form a film. In some embodiments, the binder is selected from acrylic acid polymers, acrylic acid copolymers, alkyds, polyurethanes, polyesters, epoxies, and combinations thereof. The binder in some embodiments has a glass transition temperature (Tg) from about 32° F. (≈0° C.) to about 70° F. (≈21° C.), e.g., about 32° F. to about 66° F. (≈18° C.), such as from about 40° F. (≈5° C.) to about 60° F. (≈15° C.), e.g., about 55° F. (≈13° C.). In some embodiments, the binder has a minimum film forming temperature (MMFT) from about 32° F. to about 90° F. (≈32° C.), e.g., from about 32° F. to about 86° F. (≈30° C.), such as from about 40° F. (≈5° C.) to about 60° F. (≈15° C.), e.g., about 52° F. (≈11° C.).

In some embodiments, the binder generally can be any suitable film-forming resin (or combinations thereof) capable of forming a solid film and binding solid materials to the surface to which the joint compound composition is applied. For example, the binder can be an acrylic acid polymer and/or acrylic acid copolymer in some embodiments. The binder is in the form of an aqueous emulsion in some embodiments, with suitable latex emulsion media including, but not limited to, acrylics, such as, for example, vinyl acrylics and styrenated acrylics. In some embodiments, suitable binder materials include acrylic latex, vinyl-acrylic, vinyl acetate, polyurethane, and/or combinations thereof.

Useful latex emulsion media include polyacrylate ester polymers marketed under the RHOPLEX® trade names (Rohm & Haas), acrylic polymers, vinyl acrylic polymers, for example, vinyl acetate-butyl acrylate copolymers, styrene acrylic polymers, and vinyl acetate polymers marketed under the UCAR™ and NEOCAR™ trade names (The Dow Chemical Company, Michigan) such as UCAR™ 367; emulsion polymers products marketed under the VINREZ® trade name (Halltech, Inc., Ontario); vinyl acrylic polymers marketed under the Plioway® trade name (Eliokem, Ohio); acrylic, vinyl acrylic, and styrene acrylic latex polymers marketed under the AQUAMAC™ trade name (Resolution Specialty Materials, LLC, Illinois); and vinyl acrylic resin marketed under the trade name VINREZ® 663 V15 (Halltech, Inc., Ontario), which has a glass temperature of about 18° C. Another vinyl acrylic copolymer binder is marketed under product identification no. HP-31-406 (Halltech, Inc., Ontario), and has a glass temperature of about 0° C.

Suitable functionalized acrylics, alkyds, polyurethanes, polyesters, and epoxies can be obtained from a number of commercial sources. Useful acrylics are sold under the ACRYLOID™ trade name (Rohm & Haas, Co., Pennsylvania); useful epoxy resins are sold under the EPON™ trade name (Resolution Specialty Materials, LLC, Illinois); useful polyester resins are sold under the CYPLEX® trade name (Cytec Industries, New Jersey); and useful vinyl resins are sold under the UCAR™ trade name (The Dow Chemical Company, Michigan).

The binder can be included in the joint compound composition in any suitable amount. For example, the binder can be included in an amount from about 5 wt. % to about 100 wt. % by weight (on a solids basis) of the wet composition, such as from about 20 wt. % to about 80 wt. %, from about 30 wt. % to about 70 wt. %, from about 40 wt. % to about 60 wt. %, etc.

The hollow spheres contain self contained air bound by a solid barrier. Since the air is contained within a solid shell, the air does not coalesce such that, overall, the air can be distributed throughout the compound and maintain a substantially uniform density. The hollow spheres facilitate a lower density but desirably have good strength properties, such that the hollow spheres impart crush resistance, such that the dried joint compound, after application, is substantially non-friable, in some embodiments, unlike conventional joint compound, which is friable and brittle.

The spheres in some embodiments facilitate an ultra lightweight joint compound, which results in desired properties and creates less strain on a user in lifting compound in pails, etc. during a work day. The spheres can have any suitable density, such as a density from about 0.0015 lb/in$^3$ to about 0.04 lb/in$^3$, e.g., from about 0.0018 lb/in$^3$ ($\approx$0.05 g/cm$^3$) to about 0.036 lb/in$^3$ ($\approx$1 g/cm$^3$), such as from about 0.0036 lb/in$^3$ ($\approx$0.1 g/cm$^3$) to about 0.0253 lb/in$^3$ ($\approx$0.7 g/cm$^3$). With respect to strength, for example, the spheres can have an average isostatic crush strength of at least about 50 psi ($\approx$340 kPa) as measured according to ASTM D 3102-78, such as an isostatic crush strength of at least about 100 psi ($\approx$690 kPa). For example, the isostatic strength of the spheres can be from about 50 psi to about 50,000 psi ($\approx$344,740 kPa), from about 50 psi to about 25,000 psi ($\approx$172,000 kPa), from about 50 psi to about 10,000 psi, from about 50 psi to about 5,000 psi ($\approx$34,000 kPa), from about 50 psi to about 1,000 psi, from about 50 psi to about 500 psi ($\approx$3,450 kPa), from about 100 psi to about 50,000 psi, from about 100 psi to about 25,000 psi, from about 100 psi to about 10,000 psi, from about 100 psi to about 5,000 psi, from about 100 psi to about 1,000 psi, from about 100 psi to about 500 psi, from about 250 psi ($\approx$1,720 kPa) to about 50,000 psi, from about 250 psi to about 25,000 psi, from about 250 psi to about 10,000 psi, from about 250 psi to about 5,000 psi, from about 250 psi to about 1,000 psi, from about 250 psi to about 500 psi, from about 500 psi to about 50,000 psi, from about 500 psi to about 25,000 psi, from about 500 psi to about 10,000 psi, from about 500 psi to about 5,000 psi, from about 500 psi to about 1,000 psi, from about 1,000 psi to about 50,000 psi, from about 1,000 psi to about 25,000 psi, from about 1,000 psi to about 10,000 psi, from about 1,000 psi to about 5,000 psi, from about 2,500 psi ($\approx$17200 kPa) to about 50,000 psi, from about 2,500 psi to about 25,000 psi, from about 2,500 psi to about 10,000 psi, from about 2,500 psi to about 5,000 psi, etc.

Examples of types of spheres in accordance with embodiments of the invention include lime boro-silicate, polystyrene, ceramic, recycled-glass, expanded glass, and light-weight polyolefin beads, and/or any other chemical form of plastic. For example, in some embodiments, spheres for use in the joint compound include but are not limited to soda lime boro-silicate glass bubbles (e.g., as marketed under the Scotchlite™ (3M) trade name), multi-cellular hollow glass microspheres (e.g., as marketed under the Omega-Bubbles™ (Omega Minerals) trade name), expandable polymeric microspheres (e.g., as marketed under the DUALITE® (Henkel) trade name), polyolefin micro beads and polystyrene microspheres (e.g., as marketed under the Spex•Lite® (Schabel Polymer Technology, LLC) trade name), expanded glass spheres (e.g., as marketed under the Poraver® North America trade name), and combinations thereof. As illustrative embodiments, suitable spheres can comprise Scotchlite™ (3M) K1 and/or K15.

The spheres can have any suitable diameter and can be provided in any suitable concentration. It will be understood that the term spheres is known in the art and does not imply a perfectly geometric sphere, inasmuch as the spheres can have irregular shapes. Thus, the diameter as used herein refers to the diameter of the smallest geometric sphere that encompasses the actual sphere. In some embodiments, the spheres can have a diameter from about 10 microns to about 100 microns, such as from about 40 microns to about 80 microns, or from about 50 microns to about 70 microns. With respect to amounts, in some embodiments, the spheres are present in an amount from about 2% to about 50% by weight of the wet composition, such as, for example, from about 5% to about 35%, from about 7% to about 25%, or from about 10% to about 20%.

In some embodiments, the joint compound composition, optionally, also includes surfactant. Desirably, the surfactant can facilitate stabilizing binder so the binder does not flocculate. Surfactant also desirably can provide a wetting or dispersing action. In this respect, when dry raw materials are added to water, the dry materials can compete for water and form unwanted agglomerations. Thus, in some embodiments, the surfactant is included to increase the ease of mixing when incorporating dry materials in liquid and further assists in pumping joint compound from fill stations and into pails during manufacture. The surfactant is also beneficial during use, when applying the joint compound, e.g., with dispensing tools known in the art.

For example, in some embodiments, the surfactant can be a nonionic surfactant having a hydrophilic-lipophilic balance (HLB) from about 3 to about 20, such as from about 4 to about 15 or from about 5 to about 10. It will be understood that surfactants with HLB values below 9 are generally considered to be lipophilic, those with values between 11 and 20 are generally considered to be hydrophilic, and those with values between 9 and 11 are generally considered to be intermediate. Suitable non-ionic surfactants having an HLB value below about 9 include, but are not limited to, octylphenol ethoxylates and nonylphenol ethoxylates, including non-ionic surfactants having HLB values below about 9 marketed under the TRITON™ and TERGITOL™ trade names (The Dow Chemical Company, Michigan). Suitable non-ionic surfactants having a HLB value greater than about 11 include octylphenol ethoxylates and nonylphenol ethoxylates which have more ethylene oxide units than the non-ionic surfactants having a HLB value below about 9. Useful surfactants having HLB values greater than about 11 are also marketed under the TRITON™ trade name (The Dow Chemical Company, Michigan). Other surfactants may also be used provided that the HLB value for the (blend of) surfactant(s) is as previously described for joint compound compositions and combinations thereof. If included, the nonionic surfactant can be present in any suitable amount, such as from about 0.001% to about 15% by weight of the wet composition, such as from about 0.001% to about 10%, from about 0.001% to about 5%, or from about 0.01% to about 0.5%.

One or more defoamer, such as, for example, petroleum distillate or the like, as known in the art, is optionally included in some embodiments of the joint compound composition. If included, the defoamer can be present in an amount from about 0.01% to about 15% by weight of the wet composition, such as from about 0.05% to about 5%, or from about 0.3% to about 1%.

Humectant is optionally included in some embodiments. For example, humectants can be used to help keep the joint compound wetter by facilitating retention of moisture and can also aid with use of mechanical dispensing tools. In particular, one or more humectants is included in embodiments of aqueous joint compound composition in order to slow the drying of the joint compound composition and provide a more consistent finish. Humectants can also advantageously provide freeze thaw tolerance and/or stability in the joint compound composition. Any suitable humectants can be included, such as, for example, sorbitol derivatives, polyhydric alcohols, including but not limited to glycols such as ethylene glycol, diethylene glycol (DEG), triethylene glycol, propylene glycol, di-propylene glycol, and/or tri-propylene glycol, or any combination thereof. If included, the humectants can be included in an amount from about 0.001% to about 15% by weight of the wet composition, such as from about 0.001% to about 10%, from about 0.01% to about 5%, or from about 0.001% to about 3%.

Optionally, the joint compound composition comprises a rheological modifier in some embodiments. If included, the rheological modifier is generally provided to enhance certain rheological properties such as the flow, viscosity, application properties, and other performance attributes associated with joint compounds. For example, in some embodiments, rheological modifiers are often added to provide the coating compositions with desired viscosity values as described herein, e.g., using C.W. Brabender visco-corder equipment for measuring the viscosity of the joint compound composition.

Suitable rheological modifiers for optional use in the joint compound composition include, but are not limited to, cellulosic and associative thickeners, including but limited to, hydrophobically modified ethoxylated urethanes (HEUR), hydrophobically modified alkali-swellable emulsions (HASE), and styrene-maleic anhydride terpolymers (SMAT), and/or combinations thereof. Exemplary cellulosic rheological modifiers include, but are not limited to, cellulose ethers such as hydroxyethyl cellulose (HEC), ethylhydroxyethyl cellulose (EHEC), methylhydroxyethyl cellulose (MHEC), carboxymethyl cellulose (CMC), hydroxypropylmethyl cellulose (HPMC), and/or other cellulose ethers having a molecular weight between about 1000 and 500,000 daltons, e.g., alkyl hydroxypropyl cellulose ethers, hydroxypropyl methyl celluloses, as well as xanthan gums, sodium alginates and other salts of alginic acid, carrageenans, gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives, locust bean gum (a branched galactomannan), tamarind gum, psyllium seed gum, quince seed gum, larch gum, pectin and its derivatives, dextrans, and hydroxypropylcelluloses, or any combination thereof.

If included, the rheological modifier can be included in any suitable amount, e.g., to achieve a desired viscosity as will be appreciated by one of ordinary skill in the art. For example, in some embodiments, the rheological modifier is included in an amount from about 0.01% to about 15%, by weight of the wet composition, such as from about 0.01% to about 10%, from about 0.1% to about 5%, from about 0.1% to about 3%, from about 0.1% to about 2%, or from about 0.1% to about 1%. The joint compound typically comprises from about 0.01 wt. % to about 10 wt. %, about 0.1 wt. % to about 5.0 wt. %, and/or about 0.10 wt. % to about 3.0 wt. % of the cellulosic thickener. The alkyl group of useful alkyl hydroxypropyl celluloses may contain up to 9 carbon atoms, but usually the alkyl group contains from one to three atoms. Hydroxypropyl methyl celluloses having an average of about two hydroxypropyl and/or methoxypropyl groups per anhydroglucose unit are often used. The viscosity of an aqueous solution containing about 2 wt. % of a suitable alkyl hydroxypropyl cellulose ether at 20° C. is about 60,000 centipoises (cps) to about 90,000 cps as measured with an Ubbelohde tube capillary viscometer. Alternatively, similar measurements can be made with a Brookfield rotational viscometer at a speed between about 2.5 rpm and 5 rpm. In one refinement, the initially solid-colored coating composition contains about 0.25 wt. % of an alkyl hydroxypropyl cellulose ether. Of course, other types of cellulosic thickeners may also be used, and a greater quantity may be needed if a lower viscosity thickener is used (or vice versa). Exemplary alkyl hydroxypropyl cellulose ethers are marketed under the Methocel® trade name (The Dow Chemical Company, Michigan).

Suitable associative thickeners for optional use in the joint compound compositions include hydrophobically modified ethoxylated urethanes (HEUR), hydrophobically modified alkali-swellable emulsions (HASE), and styrene-maleic anhydride terpolymers (SMAT). HEUR thickeners (also generally known as polyurethane or PUR associative thickeners) can be included in aqueous, latex-based joint compound and other yield stress fluid/solid like compositions. Acidic acrylate copolymers (cross-linked) of ethyl acrylate and methacrylic acid, and acrylic terpolymers (cross-linked) of ethyl acrylate, methacrylic acid, and nonionic urethane surfactant monomer may also optionally be used as associative thickeners. When one or more suitable associative thickeners are used, the thickening reaction is caused in part by either association between the associative thickener and at least one other particle of the joint compound composition (e.g., a pigment particle or resin particle) or another associative thickener molecule. In various embodiments, if included, the joint compound composition can comprise from about 0.01 wt. % to about 10 wt. %, about 0.1 wt. % to about 5.0 wt. %, and/or about 0.1 wt. % to about 3 wt. % of the associative thickener. Useful associative thickeners include those marketed under the Alcogum® trade name (Alco Chemical Company, TN), the Acrysol® trade name (Rohm & Haas, PA), and the Viscalex® trade name (Ciba Specialty Chemicals, NY).

In one illustrative embodiment, the rheological modifier comprises a HEUR and a cellulose ether, e.g., an alkyl hydroxypropyl cellulose ether. Without intending to be bound by any particular theory, it is believed that the combination of an associative thickener and a cellulose ether provides improved application and storage properties. For example, the lubricity and flow characteristic of the joint compound compositions (when applied to a substrate) can be improved by using such a combination of associative thickener and cellulose ether. Additionally, such a combination can help prevent the spheres of the joint compound compositions from settling out (when the joint compound compositions are stored in bulk).

The rheologically modified associative thickener system generally performs best under alkaline conditions. Thus, it is generally advisable to include a basic material in the joint compound composition in order to give the final joint compound composition a pH of at least about 8.0. A variety of basic materials may be used to increase the pH including but not limited to ammonia, caustic soda (sodium hydroxide), tri-ethylamine (TEA), and 2-amino-2-methyl-1 propanol (AMP). In various embodiments, the joint compound composition comprises about 0.001 wt. % to about 10 wt. %, about 0.01 wt. % to about 0.5 wt. %, and/or about 0.01 wt. % to about 0.50 wt. % of the alkaline/basic material.

In some embodiments, joint compound composition optionally comprises biocide in any suitable amount, e.g., from about 0% to about 3% by weight of the wet composition, such as from about 0.05% to about 2%, from about 0.1% to about 1.5%, or from about 0.1% to about 1%. If included, in some embodiments of joint compound composition, the biocide comprises a bactericide and/or a fungicide. An illustrative useful bactericide is marketed under the MERGAL 174® trade name (TROY Chemical Corporation). An illustrative useful fungicide is marketed under the FUNGITROL® trade name (International Specialty Products, New Jersey), or any combination thereof.

The joint compound composition can be formulated to have any suitable viscosity to allow for workability as will be understood in the art. For example, the viscosity of the joint compound composition when wet can have a viscosity from about 100 Brabender units (BU) to about 700 BU, such as from about 100 BU to about 600 BU, about 100 BU to about 500 BU, about 100 BU to about 400 BU, about 100 BU to about 300 BU, about 100 BU to about 200 BU, about 130 BU to about 700 BU, about 130 BU to about 600 BU, about 130 BU to about 500 BU, about 130 BU to about 400 BU, about 130 BU to about 300 BU, about 130 BU to about 200 BU, about 150 BU to about 700 BU, about 150 BU to about 600 BU, about 150 BU to about 500 BU, about 150 BU to about 400 BU, about 150 BU to about 300 BU, or about 150 BU to about 200 BU. One of ordinary skill in the art will readily recognize Brabender units. The viscosity is measured according to ASTM C474-05, Section 5 using a CW Brabender viscometer with a Type-A Pin, sample cup size of ½ pint with a 250 cm-gm cartridge Brabender Torque-Head and an RPM of 75.

Desirably, in some embodiments, to enhance the anti-shrinkage property of the joint compound composition, water content is desirably reduced compared with conventional formulations. It will be understood that some raw materials (e.g., latex emulsions and the like) are provided in an aqueous form. However, additional water (e.g., gauging water) is desirably kept low in some embodiments, e.g., in an amount of about 60% or less by weight of the wet composition, e.g., from about 0% to about 50%, such from about 0% to about 30%, from about 0% to about 15%, or from about 0% to about 10%, etc. In some embodiments, the total water content of the joint compound, including water from other raw material including latex emulsion binder, and any gauging water, could range, e.g., from about 5% to about 60% by weight of the wet composition, such as from about 10% to about 45% by weight, or from about 25% to about 45% by weight, or over.

In some embodiments, the invention provides a joint compound composition consisting essentially of (a) latex emulsion binder in an amount from about 3% to about 90% by weight of the wet composition; (b) a plurality of hollow spheres having an average isostatic crush strength of at least about 100 psi, as measured according to ASTM D3102-78, wherein the spheres are present in an amount from about 5% to about 25% by weight of the wet composition; (c) nonionic surfactant in an amount from about 0.001% to about 5% by weight of the wet composition; and (d) humectant in an amount from about 0.001% to about 3% by weight of the wet composition; and, optionally, (e) defoamer in an amount from about 0.05% to about 5% by weight of the wet composition; (f) rheological modifier in an amount from about 0.1% to about 5% by weight of the wet composition; (g) biocide, in an amount from about 0.1% to about 1.5% by weight of the wet composition; (h) bulk filler, such as calcium carbonate or limestone in an amount from about 1% to about 40% by weight of the wet composition; and (i) delaminated clay, such as kaolin clay, in an amount from about 0.1% to about 5% by weight of the wet composition. In such embodiments, the composition precludes any raw material other than the aforesaid ingredients that materially affects the inventive joint compound composition.

Embodiments of the invention also provide a wall assembly in accordance with the various aspects described herein. The wall assembly comprises two adjacent boards, joined by a seam. In some embodiments, only one-coat of the joint compound is applied over the seam to provide a uniform aesthetic appearance. However, if desired, more than one coat (e.g., two or three coats) may be applied depending on the level of finish desired. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi as measured according to ASTM D3102-78. The wall assembly further comprises dimensionally stable, non-swelling flat joint tape embedded in the seam.

Embodiments of the invention also provide a method of treating a wallboard assembly of two adjacent boards joined by a seam in accordance with the various aspects described herein. In some embodiments, the method comprises applying joint tape and one coat of the joint compound composition to the seam. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi as measured according to ASTM D3102-78. The method further comprises drying the composition. In some embodiments, after the joint compound is applied and dried, the wallboard assembly can be sanded and/or painted to give a desired visual appearance.

The following embodiments further illustrate aspects of the invention but, of course, should not be construed as in any way limiting its scope.

In an embodiment, a drying-type joint compound composition comprises, a binder selected from acrylic acid polymers, acrylic acid copolymers, alkyds, polyurethanes, polyesters, epoxies, and combinations thereof; and a plurality of hollow spheres, wherein the spheres have an average isostatic crush strength of at least about 100 psi as measured according to ASTM D3102-78.

In another embodiment of the joint compound composition, the binder is an acrylic acid polymer or acrylic acid copolymer.

In another embodiment of the joint compound composition, the binder is in the form of an aqueous emulsion.

In another embodiment of the joint compound composition, the composition has a density from about 2 lb/gal to about 8 lb/gal.

In another embodiment of the joint compound composition, the composition exhibits a shrinkage of about 2% or less as measured by ASTM C474-05.

In another embodiment of the joint compound composition, the composition is substantially free of setting minerals, bulk filler, clays, starch, mica, or a combination thereof.

In another embodiment of the joint compound composition, the composition is substantially free of calcium carbonate, expanded perlite, calcium magnesium carbonate, limestone, calcium sulfate dihydrate, delaminated clay, such as kaolin clay, talcs, diatomaceous earth, or a combination thereof.

In one embodiment of the joint compound composition, the composition is substantially free of gelling clays. Such gelling clays include attapulgites, sepiolites, bentonites, laponites, nontronites, beidellites, laponites, yakhontovites, zinc-silites, volkonskoites, hectorites, saponites, ferrosaponites, sauconites, swinefordites, pimelites, sobockites, stevensites, svinfordites, vermiculites, water-swellable synthetic clays, smectites, e.g., montmorillonites, particularly sodium montmorillonite, magnesium montmorillonite, and calcium montmorillonite, illites, mixed layered illite/smectite minerals such as rectorites, tarosovites, and ledikites, magnesium aluminum silicates, and admixtures of the clays named above. Palygorskite attapulgite clays are one type of illustrative gelling clay that are excluded in this embodiment.

In another embodiment of the joint compound composition, the binder has a glass transition temperature (Tg) from about 32° F. to about 70° F.

In another embodiment of the compound composition, the binder has a minimum film forming temperature (MMFT) from about 32° F. to about 90° F.

In another embodiment of the joint compound composition, the spheres have an isostatic crush strength of at least about 250 psi.

In another embodiment of the joint compound composition, the spheres have a density from about 0.0015 lb/in$^3$ to about 0.04 lb/in$^3$.

In another embodiment of the joint compound composition, the spheres comprise lime boro-silicate, polystyrene, ceramic, recycled-glass, expanded glass, and lightweight polyolefin beads, thermoplastic, thermoset, or any combination thereof.

In another embodiment of the joint compound composition, the composition further comprises a nonionic surfactant having a hydrophilic-lipophilic balance (HLB) from about 3 to about 20.

In another embodiment of a joint compound composition consisting essentially of: (a) latex emulsion binder in an amount from about 3% to about 90% by weight of the wet composition; (b) a plurality of hollow spheres having an average isostatic crush strength of at least about 100 psi as measured according to ASTM D3102-78, wherein the spheres are present in an amount from about 5% to about 25% by weight of the wet composition; (c) nonionic surfactant in an amount from about 0.001% to about 5% by weight of the wet composition; and (d) humectant in an amount from about 0.001% to about 3% by weight of the wet composition; and, optionally: (e) defoamer in an amount from about 0.05% to about 5% by weight of the wet composition; (f) rheological modifier in an amount from about 0.1% to about 5% by weight of the wet composition; (g) biocide, in an amount from about 0.1% to about 1.5% by weight of the wet composition; (h) bulk filler, such as calcium carbonate or limestone in an amount from about 1% to about 40% by weight of the wet composition; and (i) delaminated clay, such as kaolin clay, in an amount from about 0.1% to about 5% by weight of the wet composition.

In another embodiment, a wall assembly comprises: (a) two adjacent boards, joined by a seam; (b) only one-coat of the joint compound composition of claim 1 in the seam to provide a uniform aesthetic appearance; and (c) dimensionally stable non-swelling flat joint tape embedded in the seam.

In another embodiment of the wall assembly, at least one board has a tapered edge adjacent to the seam, the taper edge having a maximum depth of about 0.125 inch (about 0.3 cm) or less.

In another embodiment of the wall assembly, the boards comprises opposing face and back surfaces, wherein the faces of two adjacent boards are disposed with respect to each other to define an inside corner with a corner angle between the board faces from about 30° to about 180°.

In another embodiment of the wall assembly, the boards comprise opposing face and back surfaces, the faces of two adjacent boards are disposed with respect to each other to define an outside corner with an angle between the board faces from about 180° to about 300°.

In another embodiment of the wall assembly, the assembly further comprises reinforcement trim disposed over the seam, wherein the trim comprises (i) a facing material comprising paper having a dimensional stability of less than about 0.4% machine direction expansion and less than about 2.5% cross direction expansion after 30 minute immersion in water as measured according to ASTM C474-05, Section 12, and (ii) a reinforcement backing comprising paper, plastic, natural or synthetic fiber, carbon fiber, polyester, polycarbonate, fiberglass, non-woven natural or synthetic materials, woven natural or synthetic materials, spun polyolefin, or metal, wherein the backing has a thickness from about 0.012 inches (about 0.03 cm) to about 0.0625 inches (about 0.2 cm).

In another embodiment of the wall assembly, the assembly comprises adhesive for at least partially affixing the reinforcement trim to the edges of the board.

In another embodiment of the wall assembly, the assembly further comprises at least one framing member and adhesive, wherein the adhesive at least partially affixes at least one board to the framing member.

In another embodiment presented a method of treating a wallboard assembly of two adjacent boards joined by a seam, the method comprises (a) applying joint tape and one coat of the joint compound composition of claim 1 to the seam; and (b) drying the composition.

In another embodiment is presented, a reinforcement trim for protecting a seam of two adjacent boards having opposing face and back surfaces, the faces being disposed with respect to each other at an angle between the board faces, the trim comprising: a paper face characterized by a non-swelling synthetic paper facing material; and a reinforcement backing comprising paper, thermoplastic, thermoset, natural or synthetic fiber, carbon fiber, polyester, polycarbonate, fiberglass, non-woven natural or synthetic materials, woven natural or synthetic materials, spun polyolefin, or metal, wherein the backing has a thickness from about 0.012 inches (about 0.03 cm) to about 0.0625 inches (about 0.2 cm).

In another embodiment of the drying-type joint compound composition comprises, a binder selected from acrylic acid polymers, acrylic acid copolymers, alkyds, polyurethanes, polyesters, epoxies, and combinations thereof; and a plurality of hollow spheres, wherein the spheres have an average isostatic crush strength of at least about 250 psi as measured according to ASTM D3102-78; and wherein the density of the spheres are from about 0.0015 lb/in$^3$ (about 0.04 g/cm$^3$) to about 0.04 lb/in$^3$ (about 1.1 g/cm$^3$).

In another embodiment of the joint compound composition, the spheres have an isostatic crush strength of at least about 500 psi.

In another embodiment of the joint compound composition, the spheres have a density from about 0.0018 lb/in³ (≈0.05 g/cm³) to about 0.036 lb/in³ (≈1 g/cm³).

In another embodiment of the joint compound composition, in a 3/16 inch (about 0.5 cm) stripe, at least 60% of the water content is removed by drying within about 1.5 to 4.5 hours in a moderate environment of about 75° F. (about 24° C.) and about 50% relative humidity.

In another embodiment of the joint compound composition, in a 3/16 inch (about 0.5 cm) stripe, at least 60% of the water content is removed within about 1 to about 3 hours in a hot and dry environment of about 95° F. (about 35° C.) and about 10% relative humidity.

In another embodiment of the joint compound composition, in a 3/16 inch (about 0.5 cm) stripe, at least 60% of the water content is removed within about 5 to about 12.5 hours in a cold and damp environment of about 40° F. (about 4° C.) and about 80% relative humidity.

In another embodiment of the joint compound composition, in a 1/16 (about 0.2 cm) inch stripe, at least 60% of the water content is removed by drying within about 0.5 to 2 hours in a moderate environment of about 75° F. (about 24° C.) and about 50% relative humidity.

In another embodiment of the joint compound composition, in a 1/16 inch (about 0.2 cm) stripe, at least 60% of the water content is removed within about 1 hour in a hot and dry environment of about 95° F. (about 35° C.) and about 10% relative humidity.

In another embodiment of the joint compound composition, in a 1/16 inch (about 0.2 cm) stripe, at least 60% of the water content is removed within about 0.5 to about 3 hours in a cold and damp environment of about 40° F. (about 4° C.) and about 80% relative humidity.

The following examples further illustrate the invention but, of course, should not be construed as in any way limiting its scope.

Example 1

This example sets forth three sample formulations (1A, 1B, and 1C) illustrating joint compound in accordance with embodiments of the invention.

As an illustrative method of preparation, all of the liquid ingredients were added to a Hobart Model N50 mixer. In this respect, it is to be noted that the functional filler (Scotchlite K1) and rheological polymer (Cellosize DSC) were the only dry materials with the remainder considered to be in liquid form for purposes of addition to the mixer. Since the functional filler was in bulk form and the rheological polymer was in a small quantity, the rheological polymer was added to the functional filler, and the combined dry material was added to the mixer with the liquids already included. The resulting composition was mixed for approximately two minutes until uniform.

However, it will be understood that the formulations can be prepared in any suitable manner. For example, the composition can be prepared on a plant scale in horizontal shafted mixer with helical blade configuration or the like to promote suitable mixing dynamics as will be understood by one of ordinary skill in the art.

Formulation 1A is set forth in Table 1 below. It will be understood "added water" refers to additional water not already present in any of the ingredients (e.g., RHOPLEX is in the form of a 47/53 solids/water emulsion by weight).

TABLE 1

Formulation 1A

| Ingredient | Type | Weight (lb) | Wt. % |
|---|---|---|---|
| Polyacrylate Ester Emulsion (RHOPLEX E-330 ™) Rohm & Haas (UK) | Binder | 700 | 71.6% |
| Petroleum Distillate (Bubreak 4412 ™) Buckman Laboratories (Memphis, TN) | Defoamer | 4 | 0.4% |
| Octylphenol Ethoxylate (TRITON X-405 ™) The Dow Chemical Company (Midland, MI) | Surfactant | 2 | 0.2% |
| Soda-Lime-Borosilicate Glass Bubbles (SCOTCHLITE K1 ™) 3M (St. Paul, MN) | Functional Filler | 150 | 15.3% |
| 2((Hydroxymethyl)amino)ethanol (MERGAL 174 ™) Troy Chemical Corporation (Florham Park, NJ) | Biocide | 1 | 0.1% |
| Tributyltin Benzoate (FUNGITROL 158 ™) International Specialty Products (Wayne, NJ) | Biocide | 1 | 0.1% |
| Ethylene Glycol ME Global (Dubai, United Arab Emirates) | Humectant | 15 | 1.5% |
| Hydroxyethyl Cellulose (Cellosize DSC ™) The Dow Chemical Company (Midland, MI) | Rheological Polymer | 5 | 0.5% |
| Methylacrylate-based Emulsion Copolymer (Alcogum L-62 ™) Akzo Nobel (Amsterdam, Netherlands) | Rheology Modifier | 0 | 0.0% |
| Added Water | | 100 | 10.2% |
| Totals | | 978 | 100.0% |

Formulation 1B is set forth in Table 2 below.

TABLE 2

Formulation 1B

| Ingredient | Type | Weight (lb) | Wt. % |
|---|---|---|---|
| Polyacrylate Ester Emulsion (RHOPLEX E-330 ™) Rohm & Haas (UK) | Binder | 900 | 83.8% |
| Petroleum Distillate (Bubreak 4412 ™) Buckman Laboratories (Memphis, TN) | Defoamer | 0 | 0.0% |
| Octylphenol Ethoxylate (TRITON X-405 ™) The Dow Chemical Company (Midland, MI) | Surfactant | 2 | 0.2% |
| Soda-Lime-Borosilicate Glass Bubbles (SCOTCHLITE K1 ™) 3M (St. Paul, MN) | Functional Filler | 150 | 14.0% |
| 2((Hydroxymethyl)amino)ethanol (MERGAL 174 ™) Troy Chemical Corporation (Florham Park, NJ) | Biocide | 1 | 0.1% |
| Tributyltin Benzoate (FUNGITROL 158™) International Specialty Products (Wayne, NJ) | Biocide | 1 | 0.1% |
| Ethylene Glycol ME Global (Dubai, United Arab Emirates) | Humectant | 15 | 1.4% |
| Hydroxyethyl Cellulose (Cellosize DSC ™) The Dow Chemical Company (Midland, MI) | Rheological Polymer | 5 | 0.5% |

TABLE 2-continued

Formulation 1B

| Ingredient | Type | Weight (lb) | Wt. % |
|---|---|---|---|
| Methylacrylate-based Emulsion Copolymer (Alcogum L-62 ™) Akzo Nobel (Amsterdam, Netherlands) | Rheological Modifier | 0 | 0.0% |
| Added Water | | 0 | 0.0% |
| Total | | 1074 | 100.0% |

Formulation 10 is set forth in Table 3 below.

TABLE 3

Formulation 1C

| Ingredient | Type | Weight (lb) | Wt. % |
|---|---|---|---|
| Polyacrylate Ester Emulsion (RHOPLEX E-330 ™) Rohm & Haas (UK) | Binder | 800 | 74.3% |
| Petroleum Distillate (Bubreak 4412 ™) Buckman Laboratories (Memphis, TN) | Defoamer | 3 | 0.3% |
| Octylphenol Ethoxylate (TRITON X-405 ™) The Dow Chemical Company (Midland, MI) | Surfactant | 2 | 0.2% |
| Soda-Lime-Borosilicate Glass Bubbles (SCOTCHLITE K1 ™) 3M (St. Paul, MN) | Functional Filler | 150 | 13.9% |
| 2((Hydroxymethyl)amino)ethanol (MERGAL 174 ™) Troy Chemical Corporation (Florham Park, NJ) | Biocide | 1 | 0.1% |
| Tributyltin Benzoate (FUNGITROL 158 ™) International Specialty Products (Wayne, NJ) | Biocide | 1 | 0.1% |
| Ethylene Glycol ME Global (Dubai, United Arab Emirates) | Humectant | 15 | 1.4% |
| Hydroxyethyl Cellulose (Cellosize DSC ™) The Dow Chemical Company (Midland, MI) | Rheological Polymer | 2 | 0.2% |
| Methylacrylate-based Emulsion Copolymer (Alcogum L-62 ™) Akzo Nobel (Amsterdam, Netherlands) | Rheological Modifier | 6 | 0.6% |
| Added Water | | 97 | 9.0% |
| Total | | 1077 | 100.0% |

The formulations set forth in Table 1 include relatively low amounts of water and result in low shrinkage levels while also exhibiting good compressive strength and flexural strength. They can readily be applied with fewer coats than applied in conventional systems (e.g., desirably in a one-coat application system) to seams, trim, and fasteners in wall assemblies in accordance with some embodiments of the invention. As a result, Formulations 1A-1C permit efficient application without considerable delays requiring downtime as each separate coat dries. The Formulations 1A-1C also allow for easy application, requiring less skill on the part of the user, since the formulations can be applied closer to the plane of wall assemblies. The Formulations 1A-1C exhibited shrinkage from about zero to about 3% as measured in accordance with ASTM C474-05, Section 6. In addition, Formulations 1A-1C were crack resistant when measured in accordance with ASTM C474-05, Section 7.

Example 2

This Example illustrates the superior strength properties exhibited by joint compound in accordance with embodiments of the invention as compared with two different conventional joint compounds.

A total of three specimens were tested for flexural strength. Each joint compound specimen was formed and dried into a strip having a length of 10 inches, a width of 2 inches (about 5 cm), and a thickness of 0.0625 inches (about 0.2 cm). Each specimen was placed on a table with its ends seated on 0.125 (⅛) inch (about 0.3 cm) thick spacers in order to demonstrate that, with the slightest displacement, the brittle nature and friability associated with representative samples of commercially available joint compound product formulations used in the industry. A down force of about 200 gm was applied to the center of each joint compound strip with a metal probe.

Figure 19:
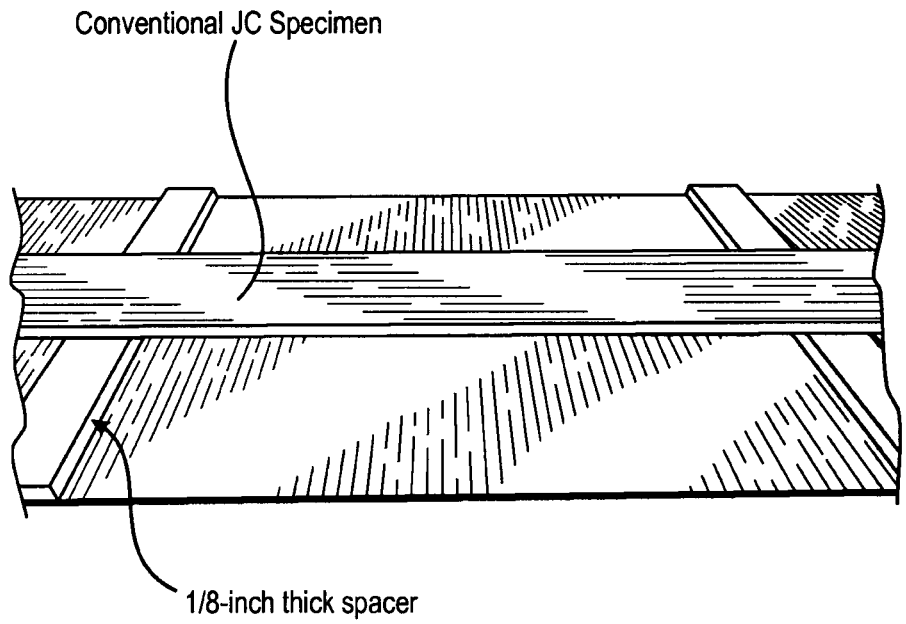
FIGS. 19-21 illustrate the progression of a flexural strength test for sample 2A of Example 2 for comparison purposes.
Figure 20:
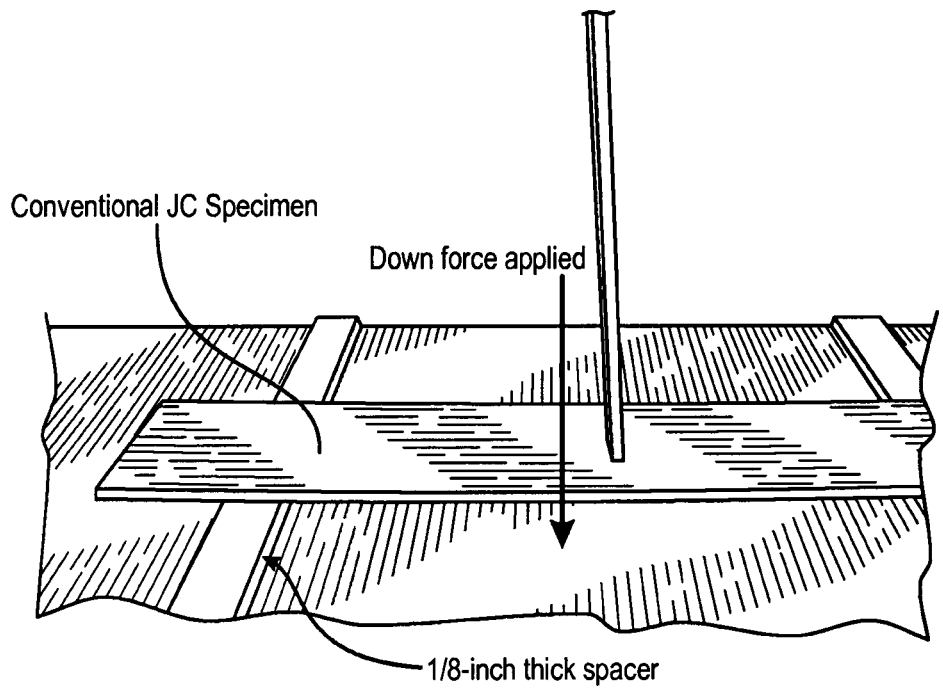
Figure 21:
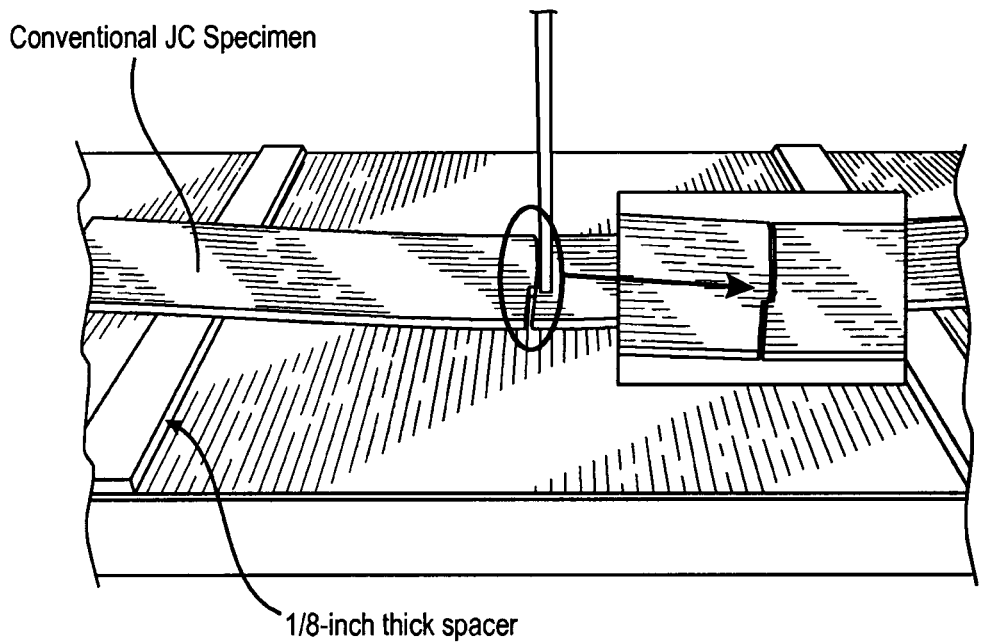

For comparative purposes, the first specimen, Formulation 2A, was a conventional joint compound commercially available as SHEETROCK® Brand Lightweight All Purpose Joint Compound from USG that has a density of approximately 14 lb/gal. The progression of the test is shown in FIGS. 19-21. As seen in FIG. 21, the joint compound broke with less than ⅛ inch deflection, thereby showing the brittle nature of the specimen.

Figure 22:
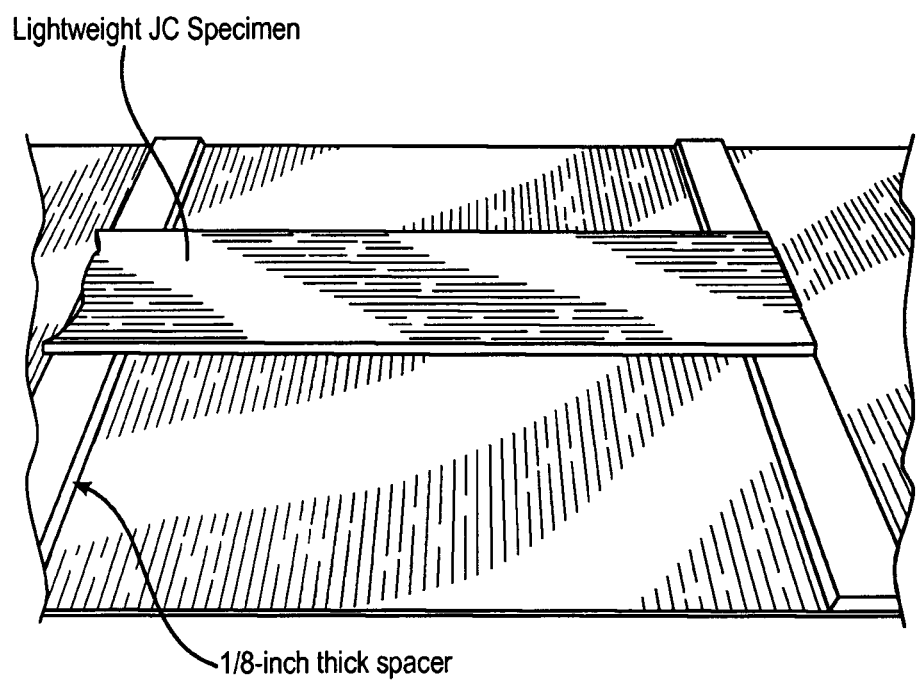
FIGS. 22-24 illustrate the progression of a flexural strength test for sample 2B of Example 2 for comparison purposes.
Figure 23:
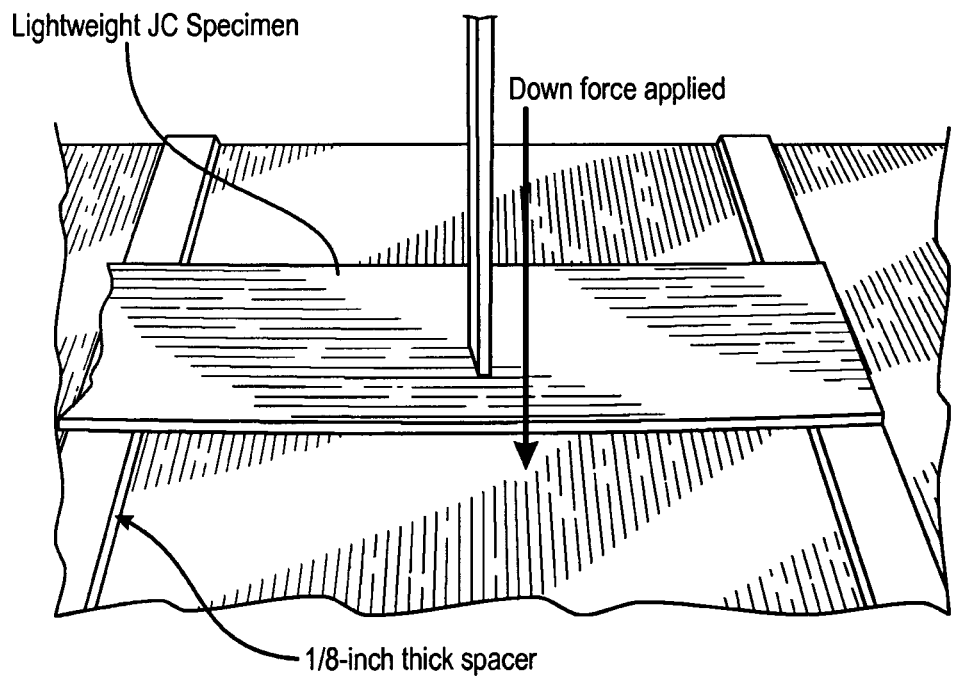
Figure 24:
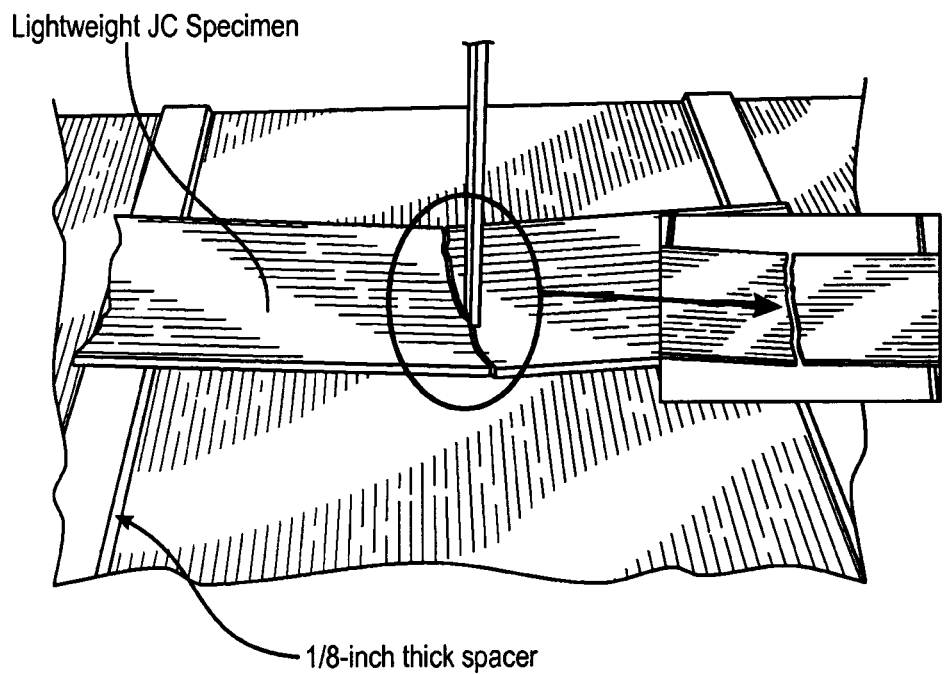

For further comparative purposes, the second specimen, Formulation 2B, was another conventional joint compound commercially available as SHEETROCK® Brand All Purpose Joint Compound from USG that has a density of approximately 8 lb/gal. The progression of the test is shown in FIGS. 22-24. As seen in FIG. 24, the joint compound broke with less than ⅛ inch deflection, thereby showing the brittle nature of the specimen.

Figure 25:
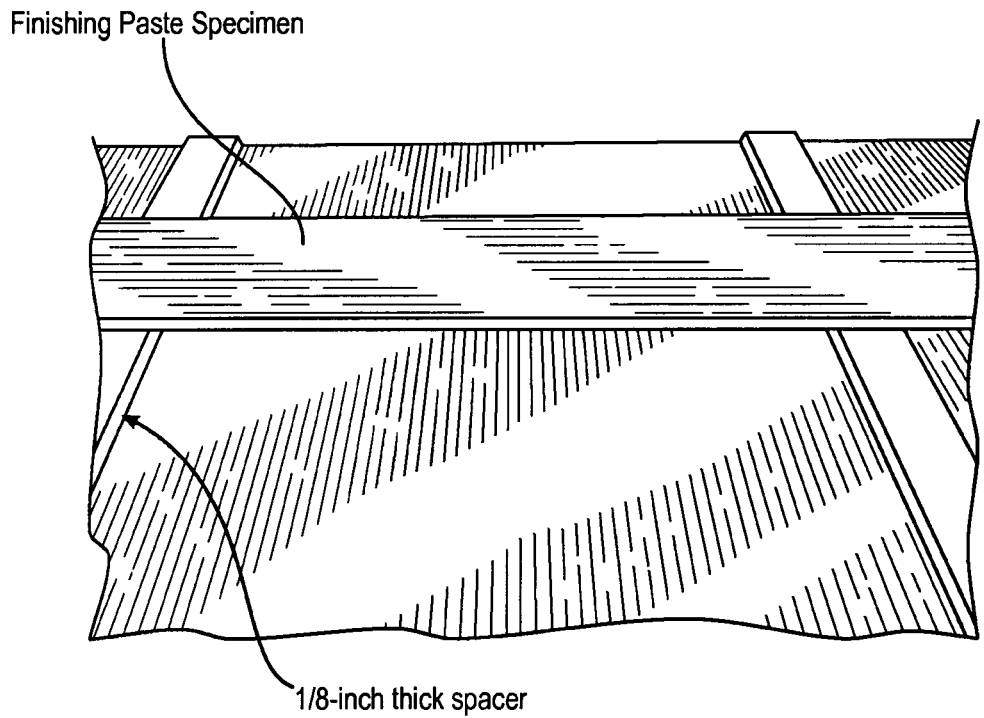
FIGS. 25-27 illustrate the progression of a flexural strength test for sample 2C of Example 2 in accordance with embodiments of the invention.
Figure 26:
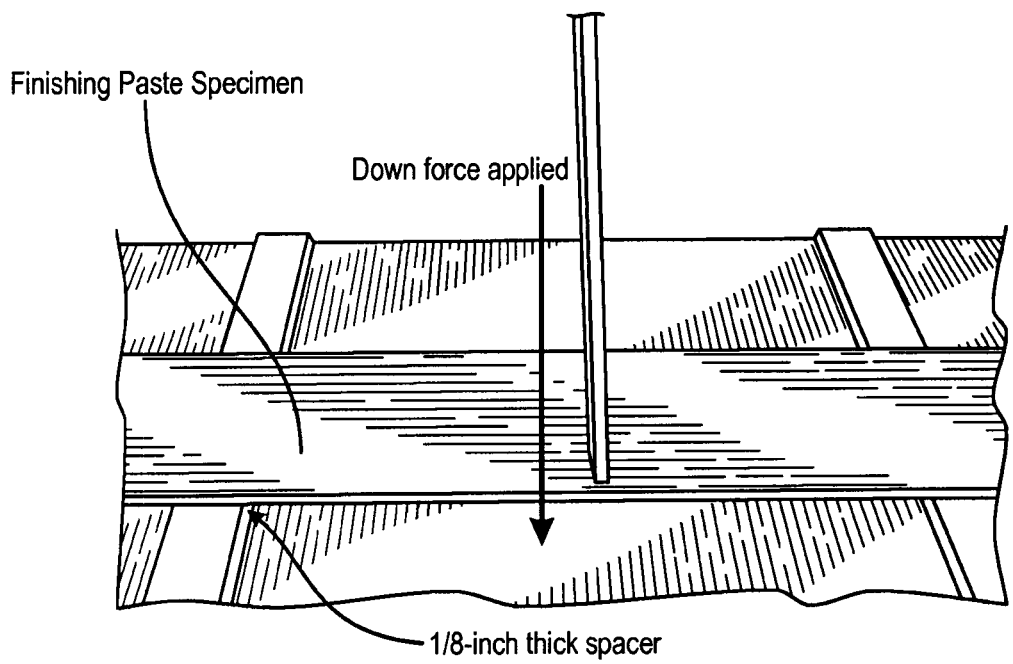
Figure 27:
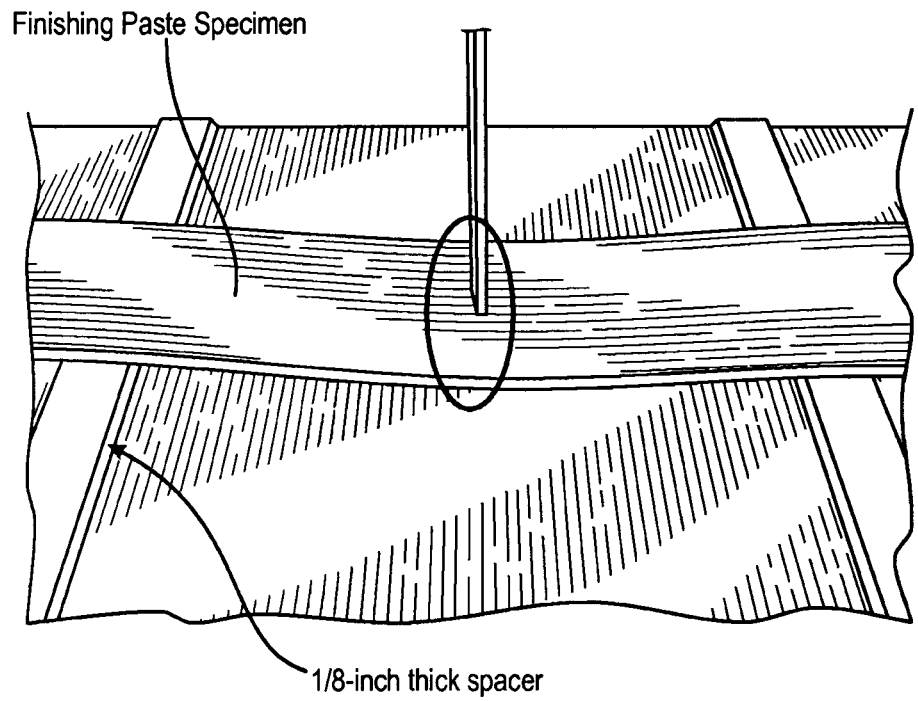
Figure 28:
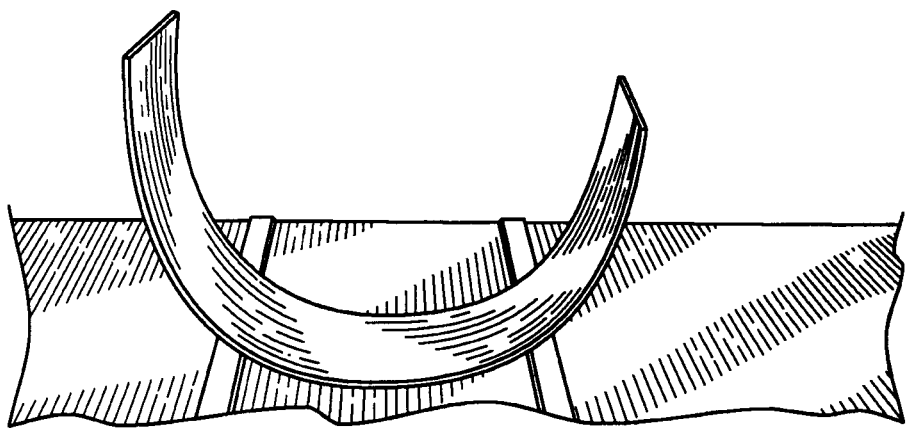
FIGS. 28-29 depict the flexural strength for sample 2C of Example 2 in accordance with embodiments of the invention.
Figure 29:
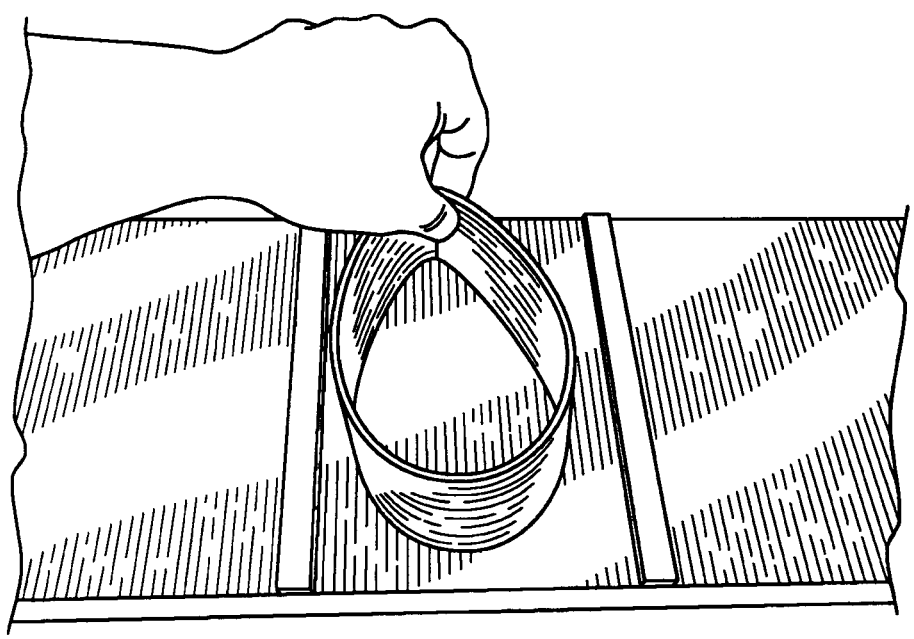

The third Formulation, 2C, was prepared in accordance with Formulation 1A, as set forth in Table 1, in accordance with embodiments of the invention Formulation 2C had a density of 3 lb/gal. The progression of the test is shown in FIGS. 25-27. As seen in FIG. 27, after ⅛ inch deflection, the sample did not crack (unlike comparative Formulations 2A and 2B). Moreover, as seen in FIG. 28, Formulation 2C did not crack or break as it was bent even more. In fact, even as Formulation 2C was bent all the way to form a loop, as seen in FIG. 29, the sample did not break or crack.

It will be understood that Formulation 2C imparted the most desirable finishing attributes of a drywall joint compound. For example, Formulation 2C did not shrink when dry. In addition, Formulation 2C remained flexible enough to resist cracking (as opposed to conventional brittle compounds shown in Formulations 2A and 2B) yet was sufficiently rigid to enable easy sanding and smoothing over the surface. Formulation 2C could also be easily painted.

Example 3

This example sets forth five sample sets of formulations (2D-F, 3A-C, 4A-C, 5A-C, and 6A-C) illustrating a joint compound in accordance with embodiments of the invention.

It will be understood that the formulations can be prepared in any suitable manner, e.g., as described in Example 1. For example, the composition can be prepared on a plant scale in a horizontal shafted mixer with helical blade configuration or the like to promote suitable mixing dynamics as will be understood by one of ordinary skill in the art.

It will be understood "added water" refers to additional water not already present in any of the ingredients.

TABLE 4

Formulation 2

| Ingredient | Type | D Weight (lb) | Wt. % | E Weight (lb) | Wt. % | F Weight (lb) | Wt. % |
|---|---|---|---|---|---|---|---|
| Rhoplex MC-1834P | Binder | 300.0 | 46.8 | 160.0 | 26.2 | 200.0 | 37.1 |
| Petroleum Distillate (Bubreak 4412 ™) Buckman Laboratories (Memphis, TN) | Defoamer | 2.0 | 0.3 | 2.0 | 0.3 | 2.0 | 0.4 |
| Octylphenol Ethoxylate (TRITON X-405 ™) The Dow Chemical Company (Midland, MI) | Surfactant | 0.5 | 0.1 | 2.1 | 0.3 | 0.5 | 0.1 |
| Soda-Lime-Borosilicate Glass Bubbles (SCOTCHLITE K1 ™) 3M (St. Paul, MN) | Functional Filler | 160.0 | 25.0 | 160.0 | 26.2 | 160.0 | 29.7 |
| 2((Hydroxymethyl)amino)ethanol (MERGAL 174 ™) Troy Chemical Corporation (Florham Park, NJ) | Biocide | 2.0 | 0.3 | 2.0 | 0.3 | 2.0 | 0.4 |
| Ethylene Glycol ME Global (Dubai, United Arab Emirates) | Humectant | 15.0 | 2.3 | 15.0 | 2.5 | 15.0 | 2.8 |
| Hydroxyethyl Cellulose (Cellosize DSC ™) The Dow Chemical Company (Midland, MI) | Rheological Polymer | 5.0 | 0.8 | 3.0 | 0.5 | 3.0 | 0.6 |
| Alcogum L-62 | Rheological Modifier | 6.0 | 0.9 | 6.0 | 1.0 | 6.0 | 1.1 |
| Added Water | | 150.0 | 23.4 | 260.0 | 42.6 | 150.0 | 27.9 |
| Total | | 640.5 | 100.0 | 610.1 | 100.0 | 538.5 | 100.0 |

TABLE 5

Formulation 3

| Ingredient | Type | A Weight (lb) | Wt. % | B Weight (lb) | Wt. % | C Weight (lb) | Wt. % |
|---|---|---|---|---|---|---|---|
| Rhoplex MC-1834P | Binder | 200.0 | 7.4 | 300.0 | 13.9 | 300.0 | 14.0 |
| Bubreak 4412 | Defoamer | 4.0 | 0.1 | 0.0 | 0.0 | 0.0 | 0.0 |
| Bubreak 4419 | Defoamer | 0.0 | 0.0 | 4.0 | 0.2 | 4.0 | 0.2 |
| Scotchlite K1 | Functional Filler | 100.0 | 3.7 | 250.0 | 11.6 | 400.0 | 18.7 |
| Scotchlite iM16K | Functional Filler | 400.0 | 14.8 | 250.0 | 11.6 | 100.0 | 4.7 |
| Microwhite 100 Calcium Carbonate | Filler | 1000.0 | 36.9 | 500.0 | 23.2 | 500.0 | 23.3 |
| Mergal 174 II | Biocide | 2.0 | 0.1 | 2.0 | 0.1 | 2.0 | 0.1 |
| Ethylene Glycol | Humectant | 0.0 | 0.0 | 0.0 | 0.0 | 15.0 | 0.7 |
| Sorbitol | Humectant | 10.0 | 0.4 | 15.0 | 0.7 | 0.0 | 0.0 |
| Actimin Kaolin Clay | Rheological modifier | 50.0 | 1.8 | 10.0 | 0.5 | 1.0 | 0.0 |
| Cellosize DCS | Rheological polymer | 10.0 | 0.4 | 10.0 | 0.5 | 10.0 | 0.5 |
| Alcogum L-62 | Rheological modifier | 0.0 | 0.0 | 6.0 | 0.3 | 6.0 | 0.3 |
| Minugel FG | Rheological modifier | 35.0 | 1.3 | 6.0 | 0.3 | 6.0 | 0.3 |
| Water | | 900.0 | 33.2 | 800.0 | 37.2 | 800.0 | 37.3 |
| Total | | 2711.0 | 100.0 | 2153 | 100.0 | 2144.0 | 100.0 |

TABLE 6

Formulation 4

| Ingredient | Type | A Weight (lb) | Wt. % | B Weight (lb) | Wt. % | C Weight (lb) | Wt. % |
|---|---|---|---|---|---|---|---|
| Rhoplex MC-1834P | Binder | 600.0 | 26.0 | 900.0 | 39.8 | 300.0 | 13.2 |
| Bubreak 4419 | Defoamer | 4.0 | 0.2 | 4.0 | 0.2 | 4.0 | 0.2 |
| Scotchlite K1 | Functional Filler | 100.0 | 4.3 | 100.0 | 4.4 | 100.0 | 4.4 |
| Scotchlite iM16K | Functional Filler | 400.0 | 17.3 | 400.0 | 17.7 | 400.0 | 17.5 |
| Microwhite 100 Calcium Carbonate | Filler | 700.0 | 30.3 | 700.0 | 31.0 | 700.0 | 30.7 |
| Mergal 174 II | Biocide | 2.0 | 0.1 | 2.0 | 0.1 | 2.0 | 0.1 |
| Sorbitol | Humectant | 10.0 | 0.4 | 10.0 | 0.4 | 10.0 | 0.4 |
| Actimin Kaolin Clay | Rheological modifier | 50.0 | 2.2 | 0.0 | 0.0 | 20.0 | 0.9 |
| Cellosize DCS | Rheological polymer | 10.0 | 0.4 | 10.0 | 0.4 | 10.0 | 0.4 |
| Minugel FG | Rheological modifier | 35.0 | 1.5 | 35.0 | 1.5 | 35.0 | 1.5 |
| Water | | 400.0 | 17.3 | 100.0 | 4.4 | 700.0 | 30.7 |
| Total | | 2311.0 | 100.0 | 2261 | 100.0 | 2281.0 | 100.0 |

TABLE 7

Formulation 5

| Ingredient | Type | A Weight (lb) | Wt. % | B Weight (lb) | Wt. % | C Weight (lb) | Wt. % |
|---|---|---|---|---|---|---|---|
| Rhoplex MC-1834P | Binder | 600.0 | 26.3 | 900.0 | 40.4 | 300.0 | 13.3 |
| Bubreak 4419 | Defoamer | 4.0 | 0.2 | 4.0 | 0.2 | 4.0 | 0.2 |
| Scotchlite S15 | Functional Filler | 100.0 | 4.4 | 250.0 | 11.2 | 400.0 | 17.8 |
| Scotchlite iM30K | Functional Filler | 400.0 | 17.5 | 250.0 | 11.2 | 100.0 | 4.4 |
| Microwhite 100 Calcium Carbonate | Filler | 700.0 | 30.7 | 700.0 | 31.4 | 400.0 | 17.8 |
| Minex 7 | Filler | 0.0 | 0.0 | 0.0 | 0.0 | 300.0 | 13.3 |
| Mergal 174 II | Biocide | 2.0 | 0.1 | 2.0 | 0.1 | 2.0 | 0.1 |
| Sorbitol | Humectant | 10.0 | 0.4 | 10.0 | 0.4 | 10.0 | 0.4 |
| Actimin Kaolin Clay | Rheological modifier | 50.0 | 2.2 | 0.0 | 0.0 | 20.0 | 0.9 |
| Cellosize DCS | Rheological polymer | 10.0 | 0.4 | 10.0 | 0.4 | 10.0 | 0.4 |
| Alcogum L-62 | Rheological modifier | 6.0 | 0.3 | 3.0 | 0.1 | 3.0 | 0.1 |
| Water | | 400.0 | 17.5 | 100.0 | 4.5 | 700.0 | 31.1 |
| Total | | 2282.0 | 100.0 | 2229 | 100.0 | 2249.0 | 100.0 |

TABLE 8

Formulation 6

| Ingredient | Type | A Weight (lb) | Wt. % | B Weight (lb) | Wt. % | C Weight (lb) | Wt. % |
|---|---|---|---|---|---|---|---|
| Rhoplex MC-1834P | Binder | 600.0 | 48.7 | 900.0 | 73.2 | 300.0 | 19.6 |
| Bubreak 4419 | Defoamer | 4.0 | 0.3 | 4.0 | 0.3 | 4.0 | 0.3 |
| Scotchlite K1 | Functional Filler | 100.0 | 8.1 | 150.0 | 12.2 | 400.0 | 26.2 |
| Scotchlite iM30K | Functional Filler | 400.0 | 32.5 | 150.0 | 12.2 | 100.0 | 6.5 |
| Mergal 174 II | Biocide | 2.0 | 0.2 | 2.0 | 0.2 | 2.0 | 0.1 |
| Sorbitol | Humectant | 10.0 | 0.8 | 10.0 | 0.8 | 10.0 | 0.7 |

TABLE 8-continued

| | | Formulation 6 | | | | | |
|---|---|---|---|---|---|---|---|
| | | A | | B | | C | |
| Ingredient | Type | Weight (lb) | Wt. % | Weight (lb) | Wt. % | Weight (lb) | Wt. % |
| Cellosize DCS | Rheological polymer | 10.0 | 0.8 | 10.0 | 0.8 | 10.0 | 0.7 |
| Alcogum L-62 | Rheological modifier | 6.0 | 0.5 | 3.0 | 0.2 | 3.0 | 0.2 |
| Water | | 100.0 | 8.1 | 0.0 | 0.0 | 700.0 | 45.8 |
| Total | | 1232.0 | 100.0 | 1229 | 100.0 | 1529.0 | 100.0 |

Example 4

The Example below Illustrates the superior flexibility, crack resistance, and strength over commercially available joint compounds when used in the novel joint system and tested using ASTM C474.

Formulations 1A and 2E, as described above, were prepared. Also, a conventional weight all-purpose joint compound (Formulation AP) and a lightweight all purpose joint compound (Formulation LW) were used for comparative purposes. Formulation AP was SHEETROCK® Brand All-Purpose Joint Compound, and Formulation LW was SHEETROCK® Brand Lightweight All Purpose Joint Compound. Each sample was prepared in triplicate.

Each Formulation was prepared and tested according to the ASTM C474 conducted in the following manner. The joint compounds were applied over a gap created at the gypsum board seam with a waxed spacer. A synthetic joint tape was affixed over the gypsum panel joint. The samples were layered on top of the tape and conditioned for 24 hours at 70° F. (about 21° C.) and 50% relative humidity. The waxed spacers were removed, and the samples were mounted into test fixtures. The fixture was loaded into the Universal Test Machine (UTM).

Each joint system was challenged under a load at 0.4 inches/min. (about 1 cm/min.) at a constant rate of displacement until the sample failed. The load and the displacement were recorded twice—first when a visual first crack was observed, and second when the system failed.

FIGS. 30-34 show the superiority of Formulations 1A and 2E to comparative Formulations AP and LW under the testing conditions.

Figure 30:
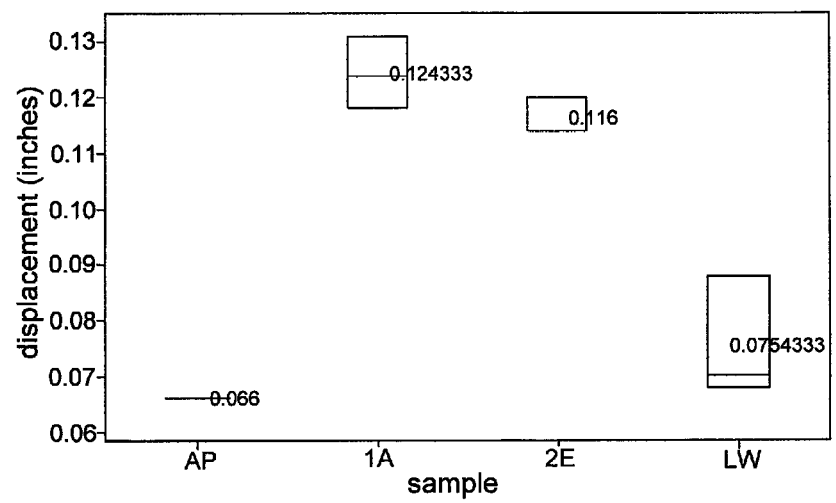
FIG. 30 is a box plot chart displaying the tension displacement when the first crack was observed and was measured in inches (Y-axis) and various joint compounds in accordance with embodiments of the invention and comparative examples (X-axis).

FIG. 30 is a box plot chart displaying the tension displacement when the first crack was observed and was measured in inches along the Y-axis, and various joint compounds, along the X-axis, specifically Formulations 1A and 2E, in accordance with embodiments of the invention and Formulations AP and LW as comparative examples. The chart illustrates that Formulations 1A and 2E were displaced about 0.12 inches (about 0.3 cm) before the observation of the first crack. On the other hand, the first crack was observed in Formulation AP at 0.06 inch (about 0.15 cm) and the first crack was observed in Formulation LW at 0.08 inch (about 0.2 cm). It is worth noting that the Formulations 1A and 2E did not visibly crack due to the displacement. They demonstrated cracks only after the underlying joint tape failed and gave way. Thus, Formulations 1A and 2E demonstrated a significantly higher crack resistance compared to the commercially available compounds, Formulations AP and LW.

Figure 31:
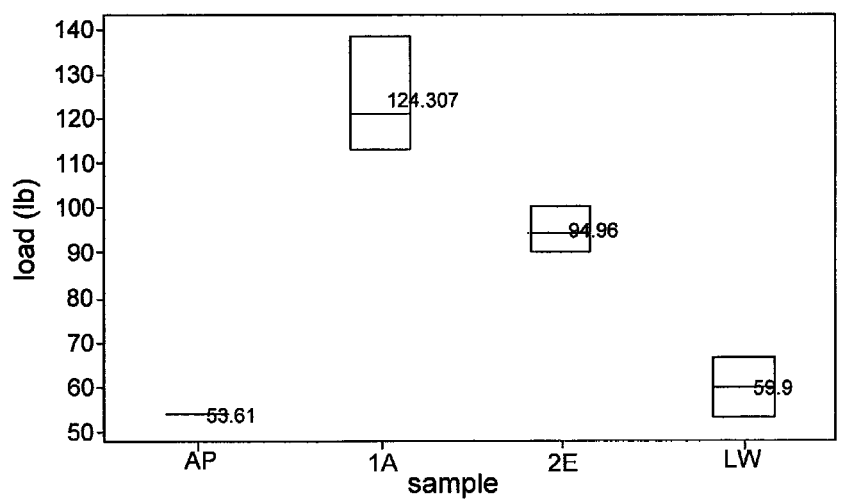
FIG. 31 is a box plot chart displaying the load (lbs) when the first crack was observed and was measured in pounds (lbs) (Y-axis) and various joint compounds in accordance with embodiments of the invention and comparative examples (X-axis).

FIG. 31 is a box plot chart displaying the load (lbs) when the first crack was observed, measured in pounds (lbs), along the Y-axis, and various joint compounds, along the X-axis, specifically Formulations 1A and 2E, in accordance with embodiments of the invention and Formulations AP and LW as comparative examples. The chart illustrates that Formulations 1A and 2E could bear 124 lb (about 56 kg) and 95 lb (about 43 lb), respectively when the first crack appeared. On the other hand, first crack in Formulation AP was observed when the load was 53 lb (about 24 kg) and first crack in Formulation LW was observed when the load was 60 lb (about 27 kg). It is worth noting that the Formulations 1A and 2E did not visibly crack due to the displacement. They demonstrated cracks only after the underlying joint tape failed and gave way. Thus, Formulations 1A and 2E demonstrated a significantly higher crack resistance and could bear significantly higher loads before failure compared to the commercially available compounds Formulations AP and LW.

Figure 32:
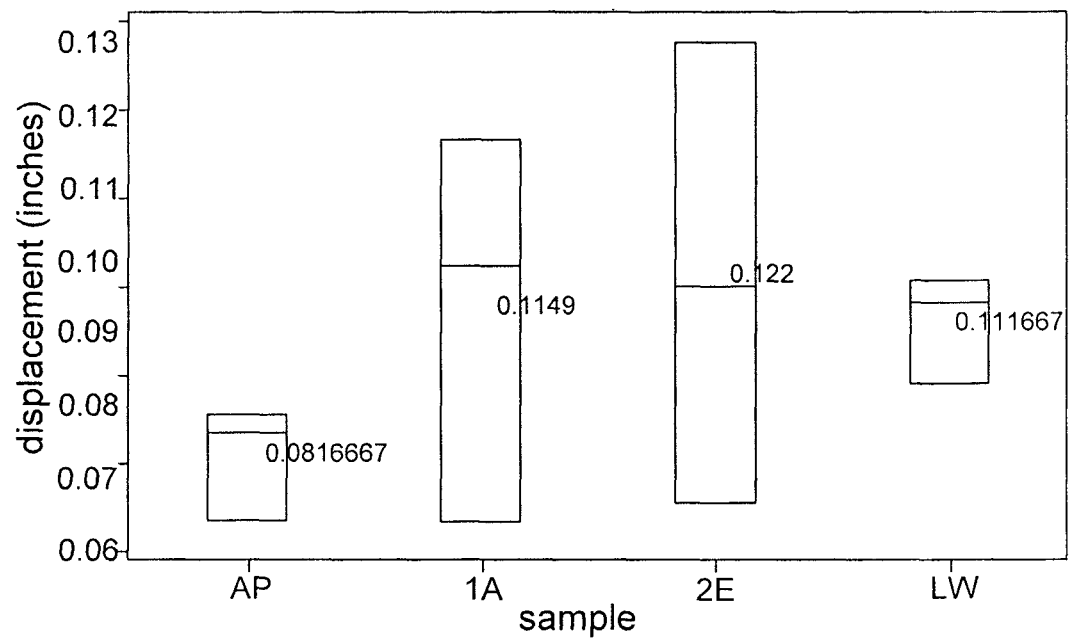
FIG. 32 is a box plot chart displaying the shear displacement when the first crack was observed and was measured in inches (Y-axis) and various joint compounds in accordance with embodiments of the invention and comparative examples (X-axis).

FIG. 32 is a box plot chart displaying the shear displacement in inches when the first crack was observed, measured in inches, along the Y-axis, and various joint compounds, along the X-axis, specifically Formulations 1A and 2E, in accordance with embodiments of the invention and Formulations AP and LW as comparative examples. The chart illustrates that Formulations 1A and 2E were displaced about 0.11 and 0.12 inches (about 0.3 cm), respectively, before the observation of the first crack. On the other hand, the first crack was observed in Formulation AP at 0.08 inch (about 0.2 cm) and the first crack was observed in Formulation LW at 0.11 inch (about 0.3 cm). It is worth noting that the Formulations 1A and 2E did not visibly crack due to the displacement. They demonstrated cracks only after the underlying joint tape failed and gave way. Thus, a large variation in the range of the data is observed for Formulations 1A and 2E. However, Formulations AP and LW visibly cracked/fractured well before the joint tape and seam failed. Thus, Formulations 1A and 2E demonstrated a significantly higher shear crack resistance compared to the commercially available compounds Formulations AP and LW.

Figure 33:
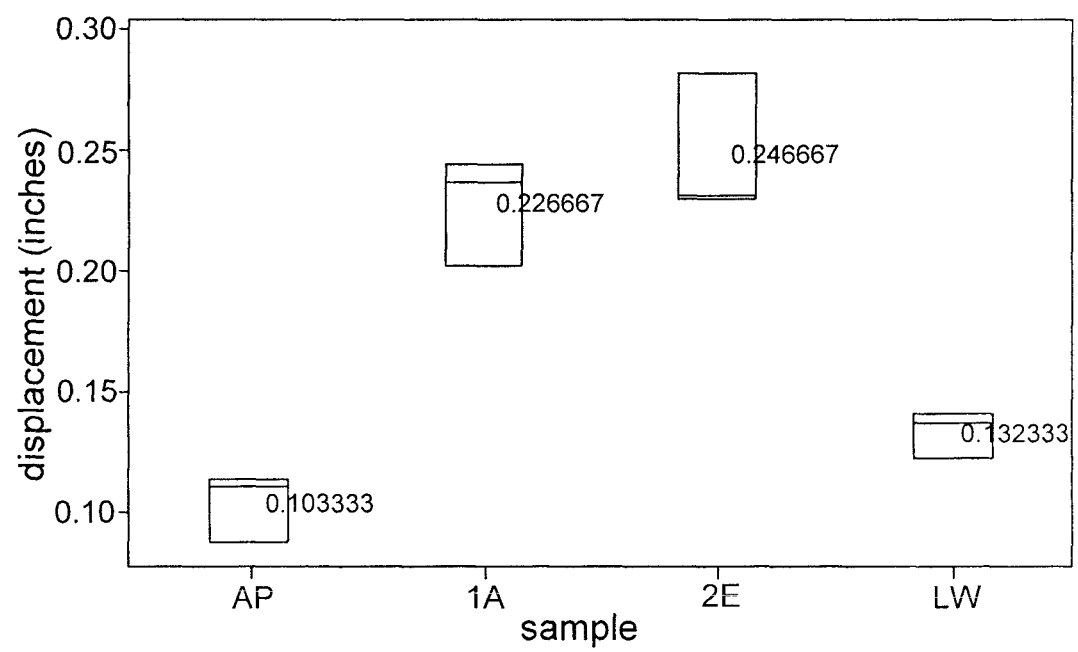
FIG. 33 is a box plot chart displaying the shear peak displacement when the first crack was observed and was measured in inches (Y-axis) and various joint compounds in accordance with embodiments of the invention and comparative examples (X-axis).

FIG. 33 is a box plot chart displaying the shear peak displacement when the first crack was observed, measured in inches, along the Y-axis, and various joint compounds along the X-axis, specifically Formulations 1A and 2E in accordance with embodiments of the invention and Formulations AP and LW as comparative examples. The chart illustrates that the peak shear displacement for Formulations 1A and 2E was 0.23 inches (about 0.6 cm) and 0.25 inches (about 0.6 cm), respectively, before the observation of the first crack. On the other hand, the first crack was observed in Formulation AP after a peak shear displacement of 0.1 inch (about 0.25 cm) and the first crack was observed in Formulation LW at a shear peak displacement of at 0.13 inch (about 0.3 cm). It is worth noting that the Formulations 1A and 2E did not visibly crack due to the displacement. They demonstrated cracks only after the underlying joint tape failed and gave way. Thus, Formulations 1A and 2E demonstrated a significantly higher peak shear displacement compared to the commercially available compounds Formulations AP and LW.

Figure 34:
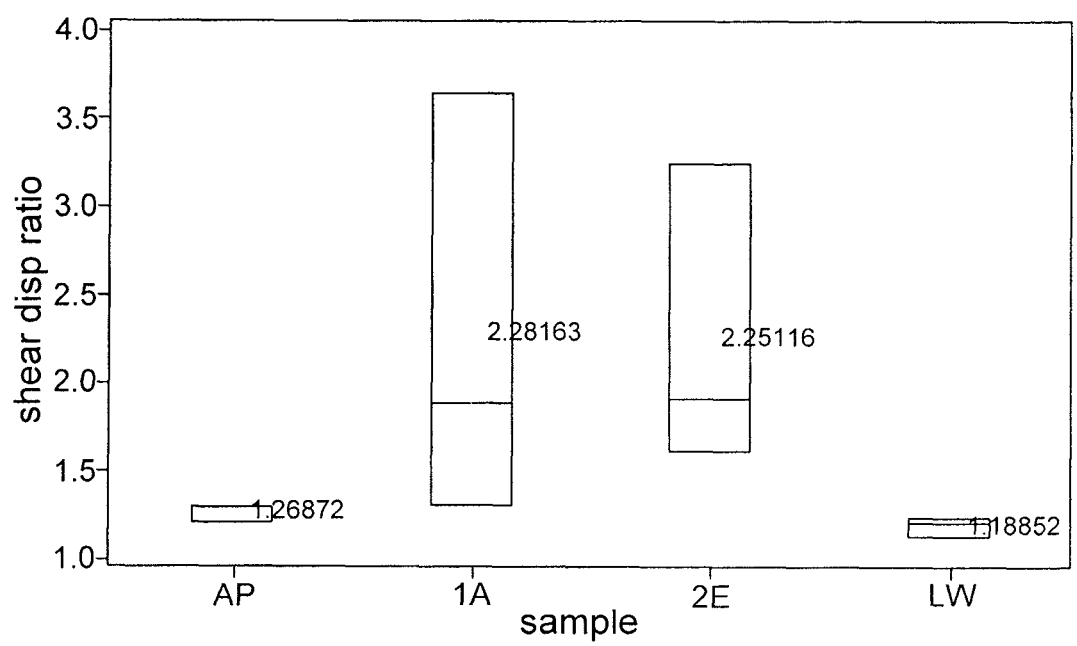
FIG. 34 is a box plot chart displaying the shear displacement ratio (i.e., a ratio of peak displacement at joint system failure to displacement at first crack) (Y-axis) and various joint compounds in accordance with embodiments of the invention and comparative examples (X-axis).

FIG. 34 is a box plot chart displaying the shear displacement ratio (i.e., a ratio of peak displacement at joint system failure to displacement at first crack) along the Y-axis, and various joint compounds along the X-axis, specifically Formulations 1A and 2E in accordance with embodiments of the invention and Formulations AP and LW as comparative examples. The chart illustrates that Formulations 1A and 2E had a shear displacement ratio of about 2.3 before the observation of the first crack but Formulation AP had a shear displacement ratio of about 1.3, and Formulation LW had a shear displacement ratio of 1.2. Thus, Formulations 1A and 2E demonstrated greater elongation and stretch properties even after the observation of the first crack until they reached complete failure by tearing in the joint system. It is worth noting that the Formulations 1A and 2E did not visibly crack due to the displacement. They demonstrated cracks only after the underlying joint tape failed and gave way. On the other hand, Formulation AP and LW compounds are brittle material and demonstrated peak displacement shortly after the first crack was visible.

The results of this Example illustrate that when the joint system was placed into tension, Formulations 1A and 2E both demonstrated a superior elongation and physical displacement before failure while Formulations AP and LW were brittle and did not impart similar performance under the same testing condition of the joint system of the present invention. Also, these commercially available joint compounds did not perform any better in the conventional joint systems.

When the joint system of the present invention was challenged under shear forces, the differences between the joint compounds of the present invention and conventional joint compounds became even more apparent. The joint compounds of this example exhibited high superior displacements and higher displacement ratios than the commercially available joint compounds. Thus, the joint compounds of the present invention demonstrated a high strength and crack resistance.

Example 5

This Example illustrates the superior flexibility and elastomeric properties or flexibility/degree of embrittlement when used in the novel joint system and tested using ASTM C711.

Each Formulation was prepared and tested according to the ASTM C711 conducted in the following manner. Samples of Formulations 1A and 2E were prepared, and representative commercially available joint compounds Formulation AP-SHEETROCK® Brand All-Purpose Joint Compound and Formulation LW-SHEETROCK® Brand Lightweight All Purpose Joint Compound were used for comparative purposes. Each sample was prepared in triplicate.

A ⅛-inch (about 0.3 cm) thick strip of joint compound (2"×10") (about 5 cm×about 25 cm) was laid over a bond breaker film, i.e., the joint compound does not adhere to film after drying. The samples were prepared in triplicate for each environmental condition. The samples were then dried under four different environmental test conditions for 24 hours. A second set of tests was conducted after conditioning for 28 days. The samples were removed from the bond breaker film and were subjected to a bending condition around a 1 inch (about 2.5 cm) diameter cylindrical mandrel to assess elastomeric and flexibility properties of the joint compounds. The samples were then visually graded on a 3 rating scale to determine the degree of elastomeric flexibility properties illustrated by ASTM C711.

It is to be noted that ASTM C711 published 2009 illustrates with photographs the differences between a satisfactory joint compound and unsatisfactory joint compounds when mounted and bent around a mandrel in accordance with the test. One provides a depiction of a satisfactory joint compound that would receive the pass rating due to a lack of cracking or any visible failure. Another depicts an unsatisfactory joint compound that would receive the Fail-A rating due to severe cracking. A third shows an unsatisfactory joint compound that would receive the Fail-B rating due to complete cracking and adhesive failure.

TABLE 9

FLEXIBILITY RESULTS - ASTM C711

| 24 Hours Environment | 1A | 2E | AP | LW |
|---|---|---|---|---|
| 40° F./80% relative humidity Cold/Humid | Pass | Pass | Fail-B | Fail-B |
| 75° F.-50% relative humidity Standard/Occupancy | Pass | Pass | Fail-B | Fail-B |
| 95° F./10% relative humidity Hot/Dry | Pass | Pass | Fail-B | Fail-B |
| 90° F./90% relative humidity Hot/Humid | Pass | Pass | Fail-B | Fail-B |

TABLE 10

FLEXIBILITY RESULTS - ASTM C711

| 28 Days Environment | 1A | 2E | AP | LW |
|---|---|---|---|---|
| 40° F./80% relative humidity Cold/Humid | Pass | Pass | Fail-B | Fail-B |
| 75° F.-50% relative humidity Standard/Occupancy | Pass | Pass | Fail-B | Fail-B |
| 95° F./10% relative humidity Hot/Dry | Pass | Pass | Fail-B | Fail-B |
| 90° F./90% relative humidity Hot/Humid | Pass | Pass | Fail-B | Fail-B |

Table 9 demonstrates the results of the visual test after conditioning the samples in four different conditions of ASTM C711 for 24 hours. The specimens Formulations 1A and 2E performed significantly better than the conventional joint compounds represented by Formulations AP and LW. While Formulations 1A and 2E received a pass rating on each of the standard condition tests, Formulations AP and LW received a Fail-B rating.

Table 10 demonstrates the results of the visual test after conditioning the samples in four different conditions of ASTM C711 for 28 days. The specimens Formulations 1A and 2E performed significantly better than the conventional joint compounds represented by Formulations AP and LW. While Formulations 1A and 2E received a pass rating on each of the standard condition tests, Formulations AP and LW received a Fail-B rating.

The conventional joint compounds were so brittle under these testing conditions that they failed when even bent less than ⅛-inch deflection and could not be bent around cylindrical mandrel without catastrophic failure. The performance of the joint compound under these test conditions helps ensure the structural adequacy and service life of the joint compounds.

Example 6

This Example Illustrates the superior properties of the joint compounds and joint system under the real world conditions that are representative of those encountered in service. The performance criteria based on data from these tests ensure structural adequacy of the joint compound and joint systems during their service life.

The joint system of the present invention and conventional joint system were tested using modified ASTM E72 in the following manner. The wall assembly joint system of the present invention was prepared using Formulations 1A and 2E compounds and compared against Formulations AP and LW. Samples of Formulations 1A and 2E were prepared, and representative commercially available joint compounds Formulation AP-SHEETROCK® Brand All-Purpose Joint Compound and Formulation LW-SHEETROCK® Brand Lightweight All Purpose Joint Compound were used for comparative purposes. Formulation AP represents a conventional weight all-purpose joint compound. Formulation LW represents a lightweight all purpose joint compound.

Formulations 1A and 2E were used to prepare a test under the Flat Joint Treatment (square edge/butt and tapered edge joints). In this system, the joint seams were taped using the synthetic joint reinforcement tape to affix the joint boards with an adhesive. A single coat of Formulation 1A or 2E was applied over the taped joint seams. The fasteners were prepared by applying one coat of the present invention joint compound Formulation 1A or 2E over the fasteners.

For comparison, the conventional joint systems are generally prepared by taping the all flat joint seams using paper joint reinforcement tape affixed to joint board with Formulation AP or LW joint compound. Three (3) separate coats of Formulation AP or LW joint compound were applied over the taped joint seams. The fasteners were prepared by three (3) separate coats of Formulation AP or LW joint compound applied over the fasteners.

FIG. 35A-35C illustrate a modified ASTM E72 racking assembly system to test the wall strength in building construction.

FIG. 35A illustrates a modified ASTM E72 racking assembly system with an 8'×8' (about 2.4 m×about 2.4 m) assembly prepared from 2"×4" wood studs (about 5 cm×about 10 cm). The wood studs are not shown. The assembly consists of two 48"×64" (about 1.2 m×about 1.6 m) and two 48"×16" (about 1.2 m×about 0.4 m) boards in a staggered configuration. Two main seams are shown with the dotted lines—a horizontal joint at the mid height level (about 4' or about 1.2 m) and two vertical joints located at the seam of the two boards.

FIG. 35B illustrates the modified ASTM E72 racking assembly system of FIG. 35A configured with the 2"×4" wood studs placed 16 inches (about 0.4 m) apart. It also illustrates the two seams—a horizontal joint at the mid height level (about 4' or about 1.2 m) and two vertical seams located at the joint of the two boards butted against the wooden studs.

FIG. 35C illustrates the modified ASTM E72 racking assembly system of FIG. 35B, where the bottom was rigidly fixed to the structure, and a force was applied at the top left corner by a hydraulic ram programmed to run a sinusoidal waveform with varying amplitudes.

During this test, plane of the board in these racking assembly systems was permitted to move only in the same plane as the face of the wall. The computer controlled hydraulic ram was programmed to run a sinusoidal waveform with amplitude of 0.025" (about 0.06 cm) at a frequency 0.5 Hz (2 seconds per cycle) for a cycle count of 500 and hammer the upper left hand corner of the assembly. After the completion of this cycle, the amplitude was increased to 0.050" (about 0.12 cm) for a cycle count of 500 cycles. After the second cycle was completed, again the amplitude was increased to 0.075" (about 0.18 cm) for a cycle count of 500 cycles. This was repeated until the amplitude reached 0.400" (about 1 cm). During this rigorous testing, the assembly was monitored continuously, and when a failure was observed, the cycle count was noted along with the location of the failure.

The results show a significant advantage of the elastic membrane effect of Formulations 1A and 2E. Even in areas where the fasteners had failed in the wall assembly, the joint compounds had not been breached or punctured. Whereas in the comparative conventional system prepared by conventional joint compounds, e.g., Formulations AP and LW, a brittle fractured effect was observed including loss of bond over the fasteners.

Example 7

This Example illustrates the superior drying properties of the joint system of the present invention.

As discussed in the specification, the existing joint compounds require three separate coats to be applied to fasteners as well as multiple coats applied to flat seams between boards in the same plane. Each coat must separately dry before applying a new coat. While, the existing coat does not need to dry completely, it is found that about 75% of the water content must evaporate from the compound before the coat becomes firm enough to receive a second layer. This creates a significant period of downtime during which the other construction trades ordinarily cannot work inside the building while the wall finishing occurs.

On the other hand, the joint compounds of the present invention only require a single coat over the seam to provide a uniform aesthetic appearance. In case a second layer is required to account for imperfect workmanship and the like, the joint compounds of the present invention become firm enough to receive the second coat when about 60% of the water evaporates from the compound.

Samples of Formulations 1A, 2E, 3A, and 4B were prepared. Also a conventional weight all-purpose joint compound (Formulation AP) as well as a lightweight all purpose joint compound (Formulation LW) were used for comparative purposes. Formulation AP was SHEETROCK® Brand All-Purpose Joint Compound, and Formulation LW was SHEETROCK® Brand Lightweight All Purpose Joint Compound.

FIGS. 36A to 36C show the drying profile of the joint compounds of the present invention compared with the conventional joint compounds for a thick coat, i.e., about 3/16 inches (about 0.5 cm), in which the percent of water evaporated (Y-axis) was plotted against the incremental drying times represented along the X-axis). FIG. 36A shows the drying profiles in a moderate environment, e.g., 75° F. and 50% relative humidity. FIG. 36B shows the drying profiles in a hot and dry environment, e.g., 95° F. and 10% relative humidity. FIG. 36C shows the drying profiles in a cold and humid environment, e.g., 40° F. and 80% relative humidity.

A thick coat (3/16 inch; about 0.5 cm) is representative of various applications, e.g., 1st or 2nd coat over corner reinforcement trim; 1st or 2nd coat over panel/wall offsets; 1st or 2nd coat over square edge butt joints; and 2nd fill coat over tapered edge joints.

As seen in FIG. 36A, 3/16 inch (about 0.5 cm) coats of Formulations 1A, 2E, 3A, and 4B illustrate similar drying profiles at moderate environment. In case a second coat is necessary, the first coats of Formulations 1A, 2E, 3A, and 4B were ready within 1.5 to 4.5 hours. On the other hand, the thick coat of Formulation LW was ready to receive a second coat at about 13 to 15 hours, while the thick coat of Formulation AP was not ready even after 24 hours.

As seen in FIG. 36B, 3/16 inch (about 0.5 cm) coats of Formulations 1A, 2E, 3A, and 4B illustrate similar drying profiles at hot-dry environment. In case a second coat is necessary, the first coats of Formulations 1A, 2E, 3A, and 4B were ready within 1 to 3 hours. On the other hand, the thick coats of Formulations LW and AP were ready to receive a second coat at about 4 to 5.5 hours.

As seen in FIG. 36C, 3/16 inch (about 0.5 cm) coats of Formulations 2E and 4B demonstrated the fastest drying times in a cold-humid environment followed by Formulations 1A and 3A. In case a second coat is necessary, the first coats of Formulations 1A, 2E, 3A, and 4B were ready within 5 to 12.5 hours. On the other hand, the thick coats of Formulations LW and AP were not ready to receive a second coat even after 24 hours.

FIGS. 37A to 37C show the drying profiles of the joint compounds of the present invention compared with the conventional joint compounds for a thin coat, i.e., about 1/16 inches (about 0.2 cm), in which the percent of water evaporated (Y-axis) was plotted against the incremental drying times represented along the X-axis). FIG. 37A shows the drying profiles in a moderate environment, e.g., 75° F. and 50% relative humidity. FIG. 37B shows the drying profiles in a hot and dry environment, e.g., 95° F. and 10% relative humidity. FIG. 37C shows the drying profiles in a cold and humid environment, e.g., 40° F. and 80% relative humidity.

A thin coat (1/16 inch; about 0.2 cm) is representative of various applications, e.g., 1st or 2nd coat over inside corner finishing; 1st, 2nd, or 3rd finishing coat over flat joints; 3rd coat over square edge butt joints; and 1st, 2nd, or 3rd coat over fasteners.

As seen in FIG. 37A, 1/16 inch (about 0.2 cm) coats of Formulations 1A, 2E, 3A, and 4B illustrate similar drying profiles at moderate environment. In case a second coat is necessary, the first coats of Formulations 1A, 2E, 3A, and 4B were ready within 0.5 to less than 2 hours. On the other hand, the thin coats of Formulations LW and AP were ready to receive a second coat at about 3.5 to 10 hours.

As seen in FIG. 37B, 1/16 inch (about 0.2 cm) coats of Formulations 1A, 2E, 3A, and 4B illustrate similar drying profiles at hot-dry environment. In case a second coat is necessary, the first coats of Formulations 1A, 2E, 3A, and 4B were ready within 1 hour. On the other hand, the thin coats of Formulations LW and AP were ready to receive a second coat at about 1.5 to over 2 hours.

As seen in FIG. 37C, 1/16 inch (about 0.2 cm) coats of Formulations 1A, 2E, 3A, and 4B illustrate similar drying times in a cold-humid environment. In case a second coat is necessary, the first coats of Formulations 1A, 2E, 3A, and 4B were ready within 0.5 to less than 3 hours. On the other hand, the thin coats of Formulations LW and AP were ready to receive a second only after 7 to more than 10 hours.

Thus, this Example shows that the joint compounds of the present invention had a faster drying profile in each of the different test environment than the conventional joint compound.

The use of the terms "a" and "an" and "the" and "at least one" and similar referents in the context of describing the invention (especially in the context of the following claims) are to be construed to cover both the singular and the plural unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B) unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A drying-type joint compound composition comprising:
   (a) binder selected from acrylic acid polymers, acrylic acid copolymers, alkyds, polyurethanes, polyesters, epoxies, and combinations thereof; and
   (b) a plurality of hollow spheres, wherein the spheres have an average isostatic crush strength of at least about 250 psi as measured according to ASTM D3102-78; and where the density of the spheres are from about 0.0015 lb/in$^3$ (about 0.04 g/cm$^3$) to about 0.04 lb/in$^3$ (about 1.1 g/cm$^3$).

2. The joint compound composition of claim 1, wherein the binder is an acrylic acid polymer or acrylic acid copolymer.

3. The joint compound composition of claim 1, wherein the binder is in the form of an aqueous emulsion.

4. The joint compound composition of claim 1, wherein the composition has a density from about 2 lb/gal to about 8 lb/gal.

5. The joint compound composition of claim 1, wherein the composition exhibits a shrinkage of about 2% or less, as measured by ASTM C474-05.

6. The joint compound composition of claim 1, wherein the composition is substantially free of setting minerals, bulk filler, clays, starch, mica, or a combination thereof.

7. The joint compound composition of claim 1, wherein the composition is substantially free of calcium carbonate, expanded perlite, calcium magnesium carbonate, limestone, calcium sulfate dihydrate, attapulgite clay, kaolin clay, talcs, diatomaceous earth, or a combination thereof.

8. The joint compound composition of claim 1, wherein the binder has a glass transition temperature (Tg) from about 32° F. to about 70° F.

9. The joint compound composition of claim 1, wherein the binder has a minimum film forming temperature (MMFT) from about 32° F. to about 90° F.

10. The joint compound composition of claim 1, wherein the spheres have an isostatic crush strength of at least about 500 psi.

11. The joint compound composition of claim 1, wherein the spheres have a density from about 0.0018 lb/in$^3$ (≈0.05 g/cm$^3$) to about 0.036 lb/in$^3$ (≈1 g/cm$^3$).

12. The joint compound composition of claim 1, wherein the spheres comprise lime boro-silicate, polystyrene, ceramic, recycled-glass, expanded glass, and lightweight polyolefin beads, thermoplastic, thermoset, or any combination thereof.

13. The joint compound composition of claim 1, further comprising a nonionic surfactant having a hydrophilic-lipophilic balance (HLB) from about 3 to about 20.

14. A wall assembly comprising:
  (a) two adjacent boards, joined by a seam;
  (b) only one-coat of the joint compound composition of claim 1 in the seam to provide a uniform aesthetic appearance; and
  (c) dimensionally stable non-swelling flat joint tape embedded in the seam.

* * * * *